US012786193B2

(12) United States Patent
Cheethirala et al.

(10) Patent No.: US 12,786,193 B2
(45) Date of Patent: Nov. 3, 2026

(54) NETWORK AUTHENTICATION AND AUTHORIZATION ISSUE DETECTION

(71) Applicant: Juniper Networks, Inc., Sunnyvale, CA (US)

(72) Inventors: Madhava Rao Cheethirala, San Jose, CA (US); Raja Rao Tadimeti, San Jose, CA (US); Natarajan Manthiramoorthy, Fremont, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 61 days.

(21) Appl. No.: 18/927,637

(22) Filed: Oct. 25, 2024

(65) Prior Publication Data

US 2026/0122068 A1 Apr. 30, 2026

(51) Int. Cl.
*H04L 9/40* (2022.01)

(52) U.S. Cl.
CPC ...... *H04L 63/0892* (2013.01); *H04L 63/0227* (2013.01)

(58) Field of Classification Search
None
See application file for complete search history.

(56) References Cited

U.S. PATENT DOCUMENTS

| | | | | |
|---|---|---|---|---|
| 7,167,912 | B1 | 1/2007 | Dhingra | |
| 9,832,082 | B2 | 11/2017 | Dade et al. | |
| 10,756,983 | B2 | 8/2020 | Ratkovic et al. | |
| 10,862,742 | B2 | 12/2020 | Singh | |
| 10,958,537 | B2 | 3/2021 | Safavi | |
| 10,958,585 | B2 | 3/2021 | Safavi | |
| 10,985,969 | B2 | 4/2021 | Safavi | |
| 10,992,543 | B1 | 4/2021 | Rachamadugu et al. | |
| 2020/0267047 | A1* | 8/2020 | Safavi | H04L 41/5067 |
| 2020/0329011 | A1* | 10/2020 | Cai | H04L 63/0263 |
| 2021/0306201 | A1 | 9/2021 | Wang et al. | |
| 2022/0294686 | A1 | 9/2022 | Triplet et al. | |
| 2024/0223489 | A1* | 7/2024 | Wu | H04L 43/106 |

FOREIGN PATENT DOCUMENTS

| | | |
|---|---|---|
| EP | 4395406 A1 | 7/2024 |

OTHER PUBLICATIONS

Extended European Search Report, EP App. No. 25210890.7, Feb. 26, 2026, 09 pages.

* cited by examiner

*Primary Examiner* — Syed A Roni
(74) *Attorney, Agent, or Firm* — Shumaker & Sieffert P.A.

(57) ABSTRACT

Techniques are disclosed that enable a system to determine whether an error associated with a cloud-based authentication, authorization, and accounting (AAA) service has occurred. The techniques include obtaining, for a plurality of network access service (NAS) devices at a site, data indicative of authentication attempts for client devices with a cloud-based AAA service. The techniques include identifying, based on the data, whether one or more errors occurred for the authentication attempts; and correlating the one or more errors across the plurality of NAS devices at the site to determine whether the one or more errors are indicative of an issue associated with the AAA service. The techniques further include determining at least one remediation action for the issue associated with the AAA service.

18 Claims, 7 Drawing Sheets

NETWORK AUTHENTICATION AND AUTHORIZATION ISSUE DETECTION

TECHNICAL FIELD

The disclosure relates generally to computer networks and, more specifically, to managing access to computer networks.

BACKGROUND

Commercial premises or sites, such as offices, hospitals, airports, stadiums, or retail outlets, often install complex wired and wireless network systems, including a network of network access server (NAS) devices throughout the premises, to provide network access and services to client devices. For example, a complex wireless network system may include wireless NAS devices, such as access points (APs), to provide wireless network services to one or more wireless client devices. NAS devices are physical, electronic devices that enable other devices to wirelessly connect to a wired network using various wireless networking protocols and technologies, such as wireless local area networking protocols conforming to one or more of the IEEE 802.11 standards (i.e., "WiFi"), Bluetooth/Bluetooth Low Energy (BLE), mesh networking protocols such as ZigBee or other wireless networking technologies.

Many different types of client devices, such as laptop computers, smartphones, tablets, wearable devices, appliances, and Internet of Things (IoT) devices, incorporate wireless communication technology and can be configured to connect to NAS devices when the client device is in range of a compatible NAS device. In order to gain access to a wired or wireless network, a client device may first need to authenticate to the NAS device. Authentication may occur via a handshake exchange between the client device, the NAS device, and an Authentication, Authorization, and Accounting (AAA) server controlling access at the NAS device.

SUMMARY

In general, this disclosure describes one or more techniques for a network management system (NMS) to detect issues associated with a cloud-based authentication, authorization, and accounting (AAA) service and determine remediation actions to resolve the detected issues. According to the disclosed techniques, the NMS is configured to detect the issues based on data indicative of authentication attempts for client devices with the AAA service that is obtained for a plurality of network access server (NAS) devices at a site. The data may be indicative of either or both of actual authentication attempts for real client devices at the site or authentication tests for simulated client devices during an authentication test at the site. The NMS identifies whether errors occurred for the authentication attempts and determines whether the errors are indicative of an issue associated with the cloud-based AAA service, e.g., a reachability issue associated with the cloud-based AAA service or a functionality issue associated with the cloud-based AAA service. The NMS determines a remediation action for the issue associated with the AAA service, such as a configuration change at one or more of the AAA service, the NMS, a network access control (NAC) system, or a firewall along a data path from the NAS devices at the site to the cloud-based AAA service.

In accordance with the disclosed techniques, the NMS obtains the data for the plurality of NAS devices at the site that is indicative of authentication attempts (both actual and test) and identifies, based on the data, whether one or more errors occurred for the authentication attempts. The one or more errors may include different error types that are identified through different processes. As one example, the NMS may identify transmission errors in which the access requests of the authentication attempts do not reach the AAA service based on transmission error reports included in the data obtained for the NAS devices. As another example, the NMS may identify authentication or authorization errors in which the NAS devices receive incorrect responses to the access requests of the authentication attempts from the AAA service. In order to determine whether the identified errors are one-off errors associated with particular NAS devices or whether they are indicative of a larger issue associated with the AAA service, the NMS correlates the one or more errors of the same error type across the plurality of NAS devices at the site to determine whether a quantity of the NAS devices that reported or experienced the type of error satisfies a threshold.

Based on the determination of an issue associated with the AAA service, the NMS determines a remediation action. In some examples, the NMS may automatically perform the remediation action. In other examples, the NMS may send a notification of the remediation action, e.g., to an administrator associated with the site and/or the enterprise. In the case of a reachability issue, the remediation action may include a configuration change at a firewall along a data path from the NAS devices at the site to the cloud-based AAA service to enable access requests of the authentication attempts to reach the cloud-based AAA service from the NAS devices at the site. In the case of a functionality issue, the remediation action may include a recommended work around to enable network access by the client devices until the functionality issue is resolved.

The techniques of this disclosure provide one or more technical advantages and practical applications. For example, the techniques enable the NMS to determine whether one or more errors have occurred for one or more authentication attempts between client devices at a site and a cloud-based AAA service, whether the one or more errors are indicative of an issue associated with the AAA service, and a remediation action to correct the issue. In some cases, issues may arise with the AAA service as a result of seemingly unrelated configuration changes and/or updates to a network at a site of an enterprise, associated network devices, and/or policies of the enterprise applied to the network or the network devices. As such, an administrator associated with the site and/or the enterprise may not be aware that such changes or updates would or could impact the AAA service. According to the disclosed techniques, the NMS may preemptively determine that there is an issue associated with the AAA service and determine an action to remediate the issue before an actual client device encounters the issue and without the administrator needing to manually test and/or troubleshoot the AAA service to determine the issue. For example, the NMS may initiate authentication tests at the site to simulate the consistent occurrence of authentication attempts, even during natural downtimes at the site, and continually test the reachability and functionality of the cloud-based AAA service against configuration changes and/or updates. In this way, the techniques of this disclosure potentially prevent network performance issues that may negatively impact an end user of the network.

In one example, this disclosure is directed to a system that includes memory and processing circuitry. The processing circuitry is configured to obtain, for a plurality of NAS devices at a site, data indicative of authentication attempts for client devices with a cloud-based AAA service. The processing circuitry is configured to identify, based on the data, whether one or more errors occurred for the authentication attempts and correlate the one or more errors across the plurality of NAS devices at the site to determine whether the one or more errors are indicative of an issue associated with the AAA service. Based on a determination that the one or more errors are indicative of the issue associated with the AAA service, the processing circuitry is configured to determine at least one remediation action.

In another example, this disclosure is directed to a method includes obtaining, for a plurality of NAS devices at a site, data indicative of authentication attempts for client devices with a cloud-based AAA service. The method includes identifying, based on the data, whether one or more errors occurred for the authentication attempts, and correlating the one or more errors across the plurality of NAS devices at the site to determine whether the one or more errors are indicative of an issue associated with the AAA service. Based on determining that the one or more errors are indicative of the issue associated with the AAA service, the method includes determining at least one remediation action.

In another example, this disclosure is directed to computer readable media including instructions stored thereon that, when executed, cause one or more processors to obtain, for a plurality of NAS devices at a site, data indicative of authentication attempts for client devices with a cloud-based AAA service. The instructions cause the one or more processors to identify, based on the data, whether one or more errors occurred for the authentication attempts, and correlate the one or more errors across the plurality of NAS devices at the site to determine whether the one or more errors are indicative of an issue associated with the AAA service. Based on a determination that the one or more errors are indicative of the issue associated with the AAA service, the instructions cause the one or more processors to determine at least one remediation action.

The details of one or more examples of the techniques of this disclosure are set forth in the accompanying drawings and the description below. Other features, objects, and advantages of the techniques will be apparent from the description and drawings, and from the claims.

DETAILED DESCRIPTION

Figure 1A:
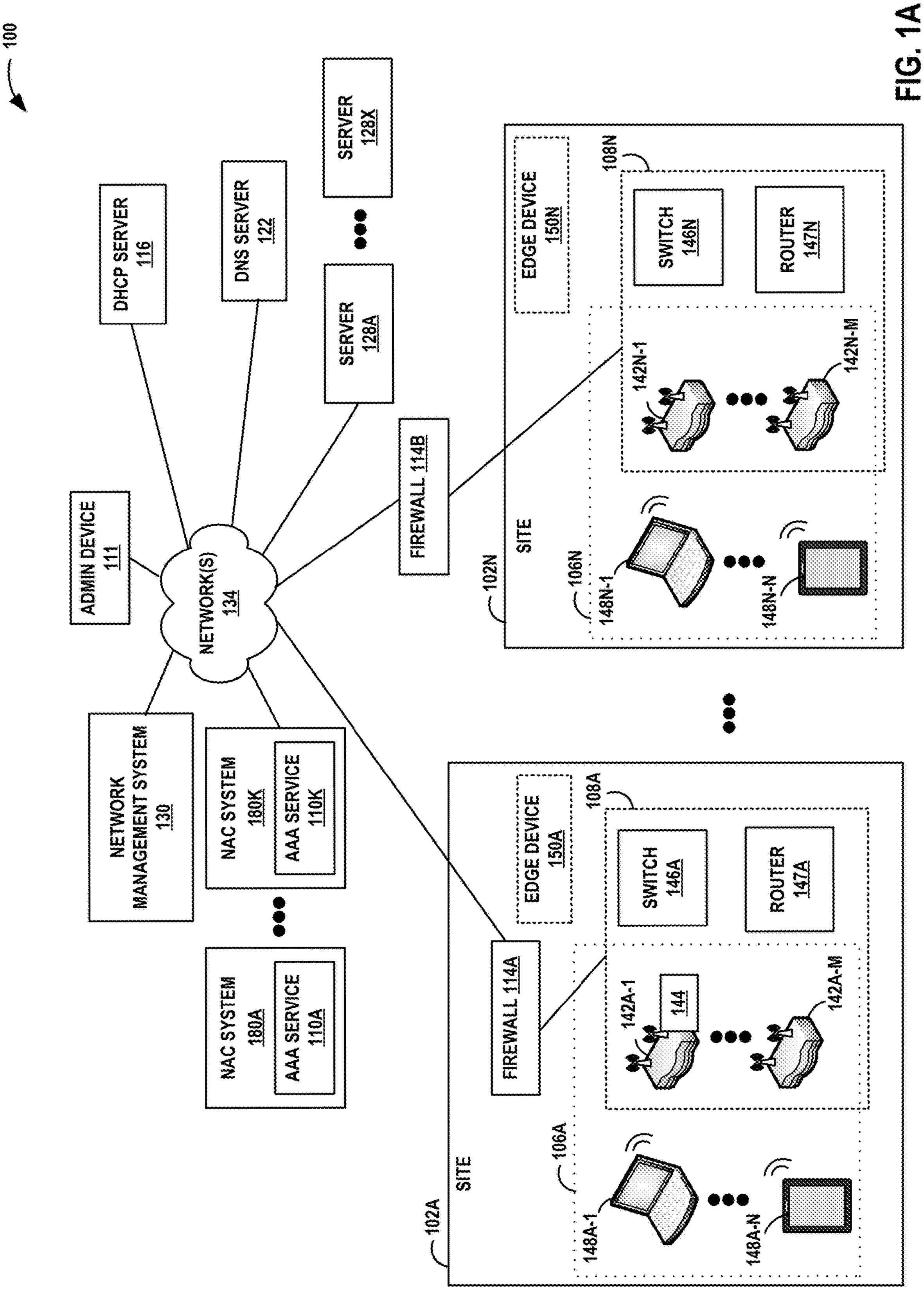
FIG. 1A is a block diagram of an example network system including a network management system and network access control systems, in accordance with one or more techniques of the disclosure.

FIG. 1A is a block diagram of an example network system 100 that includes network management system (NMS) 130 configured to detect issues associated with a cloud-based authentication, authorization, and accounting (AAA) service 110, in accordance with one or more techniques of this disclosure. Example network system 100 includes a plurality of sites 102A-102N at which a network service provider manages one or more wireless networks 106A-106N, respectively. Although in FIG. 1A each site 102A-102N is shown as including a single wireless network 106A-106N, respectively, in some examples, each site 102A-102N may include multiple wireless networks, and the disclosure is not limited in this respect.

Example network system 100 also includes cloud-based network access control (NAC) systems 180A-180K (collectively referred to as "NAC systems 180") that each include AAA services 110A-110K (collectively referred to as "AAA services 110") for authenticating users and/or client devices at sites 102. Although in this disclosure the AAA services are primarily described as services provided or implemented at the cloud-based NAC systems 180, in other examples the AAA services may be provided by any AAA server that is remotely accessible by sites 102 or by NMS 130. Throughout this disclosure the terms "AAA service" and "AAA server" are used interchangeably.

Each site 102A-102N includes a plurality of network access server (NAS) devices 108A-108N (collectively "NAS devices 108"), such as access points (APs) 142, switches 146, and routers 147. NAS devices 108 may include any network infrastructure devices capable of authenticating and authorizing client devices to access an enterprise network. For example, site 102A includes a plurality of APs 142A-1 through 142A-M, a switch 146A, and a router 147A. Similarly, site 102N includes a plurality of APs 142N-1 through 142N-M, a switch 146N, and a router 147N. Each AP 142 may be any type of wireless access point, including, but not limited to, a commercial or enterprise AP, a router, or any other device that is connected to a wired network and is capable of providing wireless network access to client devices within the site. In some examples, each of APs 142A-1 through 142A-M at site 102A may be connected to one or both of switch 146A and router 147A. Similarly, each of APs 142N-1 through 142N-M at site 102N may be connected to one or both of switch 146N and router 147N.

In the example of FIG. 1A, site 102A also includes an on-premises firewall 114A, which may be a firewall service running on a router, such as router 147A, configured to apply security policies to data traffic from client devices at site 102A to devices or systems within the enterprise network. The illustrated example of FIG. 1A also includes a cloud-based firewall 114B connected to NAS devices 108N at site 102N. Cloud-based firewall 114B may be a firewall service running on a physical or virtual router configured to apply security policies to data traffic from client devices at site 102N to devices or systems within the enterprise network.

Each site 102A-102N also includes a plurality of client devices, otherwise known as user equipment devices (UEs), referred to generally as UEs or client devices 148, representing various wireless-enabled devices within each site. For example, a plurality of UEs 148A-1 through 148A-N are currently located at site 102A. Similarly, a plurality of UEs 148N-1 through 148N-N are currently located at site 102N. Each UE 148 may be any type of wireless client device, including, but not limited to, a mobile device such as a smart phone, tablet or laptop computer, a personal digital assistant (PDA), a wireless terminal, a smart watch, smart ring, or other wearable device. UEs 148 may also include wired client-side devices, e.g., IoT devices such as printers, security devices, environmental sensors, or any other device connected to the wired network and configured to communicate over one or more wireless networks 106.

In order to provide wireless network services to UEs 148 and/or communicate over the wireless networks 106, APs 142 and the other wired client-side devices at sites 102 are connected, either directly or indirectly, to one or more network devices (e.g., switches, routers, gateways, or the like) via physical cables, e.g., Ethernet cables. Although illustrated in FIG. 1A as if each site 102 includes a single switch and a single router, in other examples, each site 102 may include more or fewer switches and/or routers. In addition, two or more switches at a site may be connected to each other and/or connected to two or more routers, e.g., via a mesh or partial mesh topology in a hub-and-spoke architecture. In some examples, interconnected switches 146 and routers 147 comprise wired local area networks (LANs) at sites 102 hosting wireless networks 106.

Example network system 100 also includes various networking components for providing networking services within the wired network including, as examples, a Dynamic Host Configuration Protocol (DHCP) server 116 for dynamically assigning network addresses (e.g., IP addresses) to UEs 148 upon authentication, a Domain Name System (DNS) server 122 for resolving domain names into network addresses, a plurality of servers 128A-128X (collectively "servers 128") (e.g., web servers, databases servers, file servers and the like), and NMS 130. As shown in FIG. 1A, the various devices and systems of network 100 are coupled together via one or more network(s) 134, e.g., the Internet and/or an enterprise intranet.

In the example of FIG. 1A, NMS 130 is a cloud-based computing platform that manages wireless networks 106A-106N at one or more of sites 102A-102N. As further described herein, NMS 130 provides an integrated suite of management tools and implements various techniques of this disclosure. In general, NMS 130 may provide a cloud-based platform for network data acquisition, monitoring, activity logging, reporting, predictive analytics, network anomaly identification, and alert generation.

NMS 130 may be configured to perform scheduling and/or orchestration of authentication tests to be performed by devices of site 102 to simulate the consistent occurrence of authentication attempts, even during natural downtimes at site 102. NMS 130 may provide a software package to one or more devices, such as APs 142, to enable APs 142 to simulate a network instance. For example, AP 142A-1 may perform one or more authentication tests using simulated network instance 144 to obtain data indicative of an authentication of simulated network instance 144. NMS 130 may receive the data indicative of authentication tests of network instance 144 from AP 142A-1 such that NMS 130 may continually test the reachability and functionality of cloud-based AAA service 110 against configuration changes and/or updates.

In some examples, NMS 130 outputs notifications, such as alerts, alarms, graphical indicators on dashboards, log messages, text/SMS messages, email messages, and the like, and/or recommendations regarding network and/or network device issues to a site or network administrator ("admin") interacting with and/or operating admin device 111. Additionally, in some examples, NMS 130 operates in response to configuration input received from the administrator interacting with and/or operating admin device 111.

The administrator and admin device 111 may comprise IT personnel and an administrator computing device associated with one or more of sites 102. Admin device 111 may be implemented as any suitable device for presenting output and/or accepting user input. For instance, admin device 111 may include a display. Admin device 111 may be a computing system, such as a mobile or non-mobile computing device operated by a user and/or by the administrator. Admin device 111 may, for example, represent a workstation, a laptop or notebook computer, a desktop computer, a tablet computer, or any other computing device that may be operated by a user and/or present a user interface in accordance with one or more aspects of the present disclosure. Admin device 111 may be physically separate from and/or in a different location than any of sites 102 and NMS 130 such that admin device 111 may communicate with NMS 130 via network 134 or other means of communication.

In some examples, one or more of NAS devices 108, e.g., APs 142, switches 146, and routers 147, may connect to edge devices 150A-150N via physical cables, e.g., Ethernet cables. Edge devices 150 comprise cloud-managed, wireless local area network (LAN) controllers. Each of edge devices 150 may comprise an on-premises device at a site 102 that is in communication with NMS 130 to extend certain microservices from NMS 130 to the on-premises NAS devices 108 while using NMS 130 and its distributed software architecture for scalable and resilient operations, management, troubleshooting, and analytics.

Each one of the network devices of network system 100, e.g., NAC systems 180, servers 116, 122 and/or 128, firewalls 114, APs 142, switches 146, routers 147, UEs 148, edge devices 150, and any other servers or devices attached to or forming part of network system 100, may include a system log or an error log module wherein each one of these network devices records the status of the network device including normal operational status and error conditions. Throughout this disclosure, one or more of the network devices of network system 100, e.g., servers 116, 122 and/or 128, firewalls 114, APs 142, switches 146, routers 147, and UEs 148, may be considered "third-party" network devices when owned by and/or associated with a different entity than NMS 130 such that NMS 130 does not directly receive, collect, or otherwise have access to the recorded status and other data of the third-party network devices. In some examples, edge devices 150 may provide a proxy through which the recorded status and other data of the third-party network devices may be reported to NMS 130.

In the example of FIG. 1A, each of NAC systems 180 comprises a cloud-based network access control service at multiple, geographically distributed points of presence. Typically, network access control functionality is offered by on-premises appliances that are limited by processing power and memory as well as maintenance and upgrade issues. Offering cloud-based network access control services avoids the limitations and improves network administration. A centralized, cloud-based deployment of network access control, however, introduces issues with latency and failures that may block client devices from network access.

In accordance with the disclosed techniques, NAC systems 180 provide multiple points of presence or NAC clouds at several geographic regions. NMS 130 is configured to manage NAC configuration, including access policies for enterprise networks, and push the appropriate NAC configuration data or files to the respective NAC clouds 180A-180K. In this way, NAC systems 180 provide the same benefits as a centralized, cloud-based network access control service with lower latency and high availability.

NAC systems 180 provide a way of authenticating client devices 148 to access wireless networks 106 of branch or campus enterprise networks. NAC systems 180 may each include or provide access to cloud-based AAA services 110, e.g., a RADIUS server, to authenticate and authorize client devices 148 prior to providing access to the enterprise network via the NAS devices 108. In some examples, NAC systems 180 may enable certificate-based authentication of client devices or enable interaction with user directory services, e.g., an active directory, to authenticate the client devices.

Access policies may be applied by NAC systems 180 during or in response to network access requests received from client devices 148. Other types of policies, e.g., security policies, routing policies, quality of service (QoS) policies, or other configuration information, may be applied to network traffic by certain network devices, e.g., on-premises firewalls 114A, cloud-based firewalls 114B, switches 146, routers 147, access points 142, or servers 128, within network system 100. For example, APs 146 and/or firewalls 114 may apply security policies to admit or block data traffic along data paths from client devices 148 to devices or systems within the enterprise network. An AP, e.g., AP 142A-1, may be configured to apply security policies at a transport layer (i.e., L4 of the Open Systems Interconnection (OSI) model) of the interconnections between client devices 148A and the devices or systems within the enterprise network, but AP 142-1 may not have the ability to apply policies at higher layers, e.g., an application layer (L7 of the OSI model), of the interconnections. However, a firewall, e.g., on-premises firewall 114A, in the data paths of client devices 148A to the devices or systems within the enterprise network may be configured to apply security policies at the application layer of the interconnections based on the actual content of messages in the exchanged data traffic.

NAC systems 180 may identify client devices 148 and provide client devices 148 with the appropriate authorizations or access policies based on their identities, e.g., by assigning the client devices to certain virtual local area networks (VLANs), applying certain access control lists (ACLs), directing the client devices to certain registration portals, or the like. NAC systems 180 may identify client devices 148 by analyzing network behavior of the client devices, referred to as fingerprinting. Identification of client devices and/or NAS devices may be performed based on media access control (MAC) addresses, DHCP options used to request IP addresses, link layer discovery protocol (LLDP) packets, Hypertext Transfer Protocol (HTTP) user agent information, location information, DNS information, and/or device type and operating system information.

Client devices 148 may include multiple different categories of devices with respect to a given enterprise, such as trusted enterprise devices, bring-your-own-device (BYOD) devices, IoT devices, and guest devices. NAC system 180 may be configured to subject each of the different categories of devices to different types of tracking, different types of authorization, and different levels of access privileges. In some examples, after a client device gains access to the enterprise network, NAC systems 180 may monitor activities of the client device to identify security concerns and, in response, re-assign the client device to a quarantine VLAN or another less privileged VLAN to restrict access of the client device.

NMS 130 is configured to operate according to an artificial intelligence/machine-learning-based computing platform providing comprehensive automation, insight, and assurance (WiFi Assurance, Wired Assurance and WAN assurance) spanning from "client," e.g., client devices 148 connected to wireless networks 106 and wired local area networks (LANs) at sites 102 to "cloud," e.g., cloud-based application services that may be hosted by computing resources within data centers.

As described herein, NMS 130 provides an integrated suite of management tools and implements various techniques of this disclosure. In general, NMS 130 may provide a cloud-based platform for wireless network data acquisition, monitoring, activity logging, reporting, predictive analytics, network anomaly identification, and alert generation. For example, NMS 130 may be configured to proactively monitor and adaptively configure network 100 so as to provide self-driving capabilities.

In some examples, AI-driven NMS 130 also provides configuration management, monitoring and automated oversight of software defined wide-area networks (SD-WANs), which operate as an intermediate network communicatively coupling wireless networks 106 and wired LANs at sites 102 to data centers and application services. In general, SD-WANs provide seamless, secure, traffic-engineered connectivity between "spoke" routers (e.g., routers 147) of the wired LANs hosting wireless networks 106 of branch or campus enterprise networks, to "hub" routers further up the cloud stack toward the cloud-based application services. SD-WANs often operate and manage an overlay network on an underlying physical Wide-Area Network (WAN), which provides connectivity to geographically separate customer networks. In other words, SD-WANs extend Software-Defined Networking (SDN) capabilities to a WAN and allow network(s) to decouple underlying physical network infrastructure from virtualized network infrastructure and applications such that the networks may be configured and managed in a flexible and scalable manner.

In some examples, AI-driven NMS 130 may enable intent-based configuration and management of network system 100, including enabling construction, presentation, and execution of intent-driven workflows for configuring and managing devices associated with wireless networks 106, wired LAN networks, and/or SD-WANs. For example, declarative requirements express a desired configuration of network components without specifying an exact native device configuration and control flow. By utilizing declarative requirements, what should be accomplished may be specified rather than how it should be accomplished. Declarative requirements may be contrasted with imperative instructions that describe the exact device configuration syntax and control flow to achieve the configuration. By utilizing declarative requirements rather than imperative instructions, a user and/or user system is relieved of the burden of determining the exact device configurations required to achieve a desired result of the user/system. For example, it is often difficult and burdensome to specify and manage exact imperative instructions to configure each device of a network when various different types of devices from different vendors are utilized. The types and kinds of devices of the network may dynamically change as new devices are added and device failures occur. Managing various different types of devices from different vendors with different configuration protocols, syntax, and software versions to configure a cohesive network of devices is often difficult to achieve. Thus, by only requiring a user/system to specify declarative requirements that specify a desired result applicable across various different types of devices, management and configuration of the network devices becomes more efficient. Further example details and techniques of an intent-based network management system are described in U.S. Pat. No. 10,756,983, entitled "Intent-based Analytics," and U.S. Pat. No. 10,992,543, entitled "Automatically generating an intent-based network model of an existing computer network," each of which is hereby incorporated by reference.

This disclosure describes one or more techniques for NMS 130 to detect issues associated with cloud-based AAA services 110 and determine remediation actions to resolve the detected issues. NMS 130 is configured to detect the issues based on data indicative of authentication attempts for client devices with cloud-based AAA service 110 that is obtained for NAS devices 108 at sites 102. The data may be indicative of either or both of actual authentication attempts for real client devices (e.g., client devices 148A at site 102A) or authentication tests for simulated client devices (e.g., simulated network instance 144 of AP 142A-1 at site 102). NMS 130 identifies whether errors occurred for the authentication attempts and determines whether the errors are indicative of an issue associated with cloud-based AAA services 110, e.g., a reachability issue associated with AAA service 110A or a functionality issue associated with cloud-based AAA service 110A. NMS 130 determines a remediation action for the issue associated with cloud-based AAA services 110, such as a configuration change at one or more of cloud-based AAA services 110, NMS 130, NAC systems 180, or firewalls 114 along a data path from the NAS devices 108 at sites 102 to cloud-based AAA services 110.

Although the techniques of the present disclosure are described in this example as performed by NAC systems 180 and/or NMS 130, techniques described herein may be performed by any other computing device(s), system(s), and/or server(s), and that the disclosure is not limited in this respect. For example, one or more computing device(s) configured to execute the functionality of the techniques of this disclosure may reside in a dedicated server or be included in any other server in addition to or other than NAC systems 180 or NMS 130, or may be distributed throughout network 100, and may or may not form a part of NAC systems 180 or NMS 130.

Figure 1B:
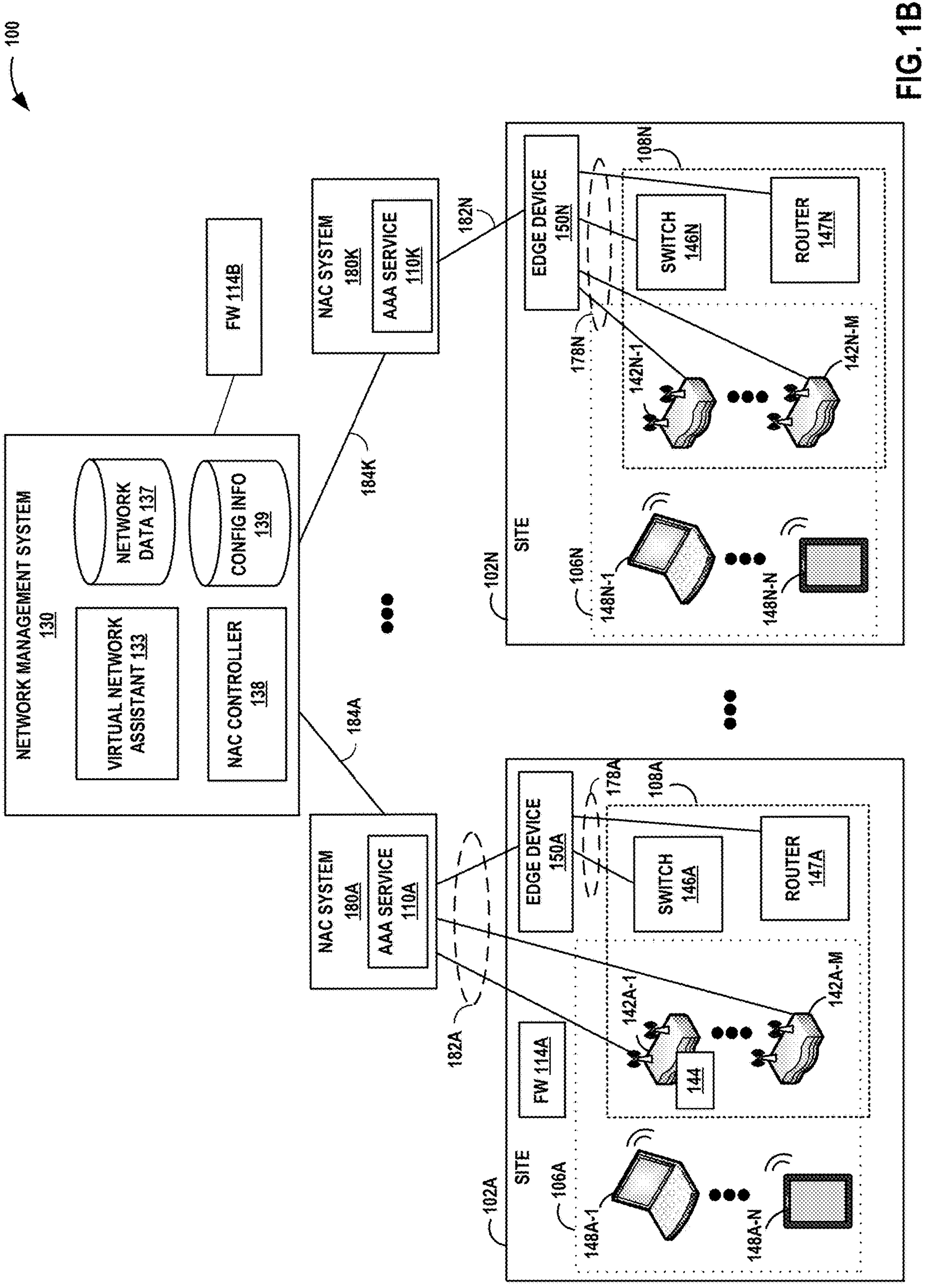
FIG. 1B is a block diagram illustrating further example details of the network system of FIG. 1A.

FIG. 1B is a block diagram illustrating further example details of the network system of FIG. 1A. In this example, FIG. 1B illustrates logical connections 178A-178N, 182A-182N, and 184A-184K, between NAS devices 108 at sites 102, NAC systems 180, and NMS 130. In addition, FIG. 1B illustrates NMS 130 configured to operate according to an AI-based computing platform to provide configuration and management of one or more of NAC systems 180 and NAS devices 108 at sites 102 via the logical connections.

In operation, NMS 130 observes, collects and/or receives network data 137, which may take the form of data extracted from messages, counters, and statistics, for example, from one or more of APs 142, switches 146, routers 147, edge devices 150, NAC systems 180, and/or other nodes within network 134. NMS 130 provides a management plane for network 100, including management of enterprise-specific configuration information 139 for one or more of NAS devices 108 at sites 102 and NAC systems 180. Each of the one or more NAS devices 108 and each of NAC systems 180 may have a secure connection with NMS 130, e.g., a WebSocket or another secure tunnel. Each of the NAS devices 108 and NAC systems 180 may download the appropriate enterprise-specific configuration information 139 from NMS 130 and enforce the configuration. In some scenarios, one or more of the NAS devices 108 may be a third-party device or otherwise not support establishment of a secure connection directly with NMS 130. In these scenarios, edge devices 150 may provide proxies through which the NAS devices 108 may connect to NMS 130.

In accordance with one specific implementation, a computing device is part of NMS 130. In accordance with other implementations, NMS 130 may comprise one or more computing devices, dedicated servers, virtual machines, containers, services, or other forms of environments for performing the techniques described herein. Similarly, computational resources and components implementing VNA 133 may be part of NMS 130, may execute on other servers or execution environments, or may be distributed to nodes within network 134 (e.g., routers, switches, controllers, gateways, and the like).

In some examples, NMS 130 monitors network data 137, e.g., one or more service level expectation (SLE) metrics, error reports, or authentication responses, received from NAS devices 108 at each site 102A-102N, and manages network resources, such as the one or more of APs 142, switches 146, routers 147, and edge devices 150 at each site, to deliver a high-quality wireless experience to end users, IoT devices and clients at the site. In other examples, NMS 130 monitors network data 137 received from NAC systems 180 and manages enterprise-specific configuration information 139 for NAC systems 180 to enable unconstrained network access control services for client devices 148 at sites 102 with low latency and high availability.

As illustrated in FIG. 1B, NMS 130 may include a virtual network assistant (VNA) 133 that implements an event processing platform for providing real-time insights and simplified troubleshooting for IT operations, and that automatically takes corrective action or provides recommendations to proactively address network issues. VNA 133 may, for example, include an event processing platform configured to process hundreds or thousands of concurrent streams of network data 137 from sensors and/or agents associated with APs 142, switches 146, routers 147, edge devices 150, NAC systems 180, and/or other nodes within network 134. For example, VNA 133 of NMS 130 may include an underlying analytics and network error identification engine and alerting system in accordance with various examples described herein. The underlying analytics engine of VNA 133 may apply historical data and models to the inbound event streams to compute assertions, such as identified anomalies or predicted occurrences of events constituting network error conditions. Further, VNA 133 may provide real-time alerting and reporting to notify a site or network administrator via admin device 111 of any predicted events, anomalies, trends, and may perform root cause analysis and automated or assisted error remediation. In some examples, VNA 133 of NMS 130 may apply machine learning techniques to identify the root cause of error conditions detected or predicted from the streams of network data 137. If the root cause may be automatically resolved, VNA 133 may invoke one or more corrective actions to correct the root cause of the error condition, thus automatically improving the underlying SLE metrics and also automatically improving the user experience.

Further example details of operations implemented by the VNA 133 of NMS 130 are described in U.S. Pat. No. 9,832,082, issued Nov. 28, 2017, and entitled "Monitoring Wireless Access Point Events," U.S. Publication No. US 2021/0306201, published Sep. 30, 2021, and entitled "Network System Fault Resolution Using a Machine Learning Model," U.S. Pat. No. 10,985,969, issued Apr. 20, 2021, and entitled "Systems and Methods for a Virtual Network Assistant," U.S. Pat. No. 10,958,585, issued Mar. 23, 2021, and entitled "Methods and Apparatus for Facilitating Fault Detection and/or Predictive Fault Detection," U.S. Pat. No. 10,958,537, issued Mar. 23, 2021, and entitled "Method for Spatio-Temporal Modeling," and U.S. Pat. No. 10,862,742, issued Dec. 8, 2020, and entitled "Method for Conveying AP Error Codes Over BLE Advertisements," all of which are incorporated herein by reference in their entirety.

In addition, as illustrated in FIG. 1B, NMS 130 may include a NAC controller 138 that implements a NAC configuration platform that provides a user interface to create and assign access policies for client devices 148 of enterprise wireless networks 106, and provides the appropriate enterprise-specific configuration information 139 to the respective NAC clouds 180A-180K. NMS 130 may have a secure connection 184A-184K, e.g., a WebSocket or another secure tunnel, with each of NAC systems 180A-180K, respectively. Through secure connections 184, NAC controller 138 may receive network data 137, e.g., NAC event data, from each of NAC systems 180 and each of NAC systems 180 may download the appropriate configuration information 139 from NMS 130. In some examples, NAC controller 138 may log or map which enterprise networks are served by which of NAC systems 180. In addition, NAC controller 138 may monitor NAC systems 180 to identify failures of primary NAC systems and manage failovers to standby NAC systems.

NAC systems 180 provide network access control services in a control plane for one or more of NAS devices 108 at sites 102. In operation, NAC systems 180 authenticate client devices 148 to access enterprise wireless networks 106 and may perform fingerprinting to identify the client devices 148 and apply authorizations or access polices to the client devices 148 based on the identities. NAC systems 180 include multiple, geographically distributed points of presence. For example, NAC system 180A may comprise a first cloud-based system positioned within a first geographic region, e.g., U.S. East, NAC system 180B (not shown) may comprise a second cloud-based system positioned within a second geographic region, e.g., U.S. West, and NAC system 180K may comprise a $k^{th}$ cloud-based system positioned within a $k^{th}$ geographic region, e.g., China.

Deploying multiple NAC clouds at several geographic regions enables network access control services to be offered to nearby NAS devices with lower latency and high availability, while avoiding the processing limitations and maintenance issues experienced by on-premises NAC appliances. For example, NAS devices 108A within enterprise network site 102A may connect to the physically closest one of NAC systems, i.e., NAC system 180A, to experience lower latency for network access control services. In some examples, the physically closest one of NAC systems 180 may comprise a primary NAC system, and the NAS devices may also connect to a next closest one of NAC systems 180 as a standby NAC system in case of a failure of the primary NAC system. For example, NAS devices 108A within enterprise network site 102A may connect to both NAC system 180A and NAC system 108B (not shown), to experience high availability of network access control services.

In the example illustrated in FIG. 1B, each of the NAS devices 108, directly or indirectly, has a secure connection with at least one of NAC systems 180. For example, each of APs 142A within site 120A has a direct, secure connection 182A to NAC system 180A, e.g., a RadSec (RADIUS over Transport Layer Security (TLS)) tunnel or another encrypted tunnel. Each of switch 146A and router 147A within site 102A has an indirect connection to NAC system 180A via edge device 150A. In this example, switch 146A and router 147A may not support establishment of a secure connection directly with NAC system 180A, but edge device 150A may provide a proxy through which switch 146A and router 147A may connect to NAC system 180A. For example, each of switch 146A and router 147A have a direct connection 178A, e.g., a RADIUS tunnel, to edge device 150A, and edge device 150A has a direct, secure connection 182A to NAC system 180A. Similarly, for site 102N, each of NAS devices 108N has an indirect connection to NAC system 180K via edge device 150N. In this example, APs 142N, switch 142N, and router 147N may not support establishment of a secure connection directly with NAC system 180K, but edge device 150N may provide a proxy through which NAS devices 108N may connect to NAC system 180K. For example, each of APs 142N, switch 146N, and router 147N have a direct connection 178N, e.g., a RADIUS tunnel, to edge device 150N, and edge device 150N has a direct, secure connection 182N to NAC system 180K.

Through secure connections 182, NAC systems 180 may receive network access requests from client devices 148 through NAS devices 108 (and in some cases edge devices 150) at nearby enterprise sites 102. In response to the network access requests, NAC systems 180 authenticate the requesting client devices using AAA services 110. NAC system 180 may perform fingerprinting to identify the authenticated client devices. NAC systems 180 then enforce the appropriate access policies on the identities of the authenticated client devices per the enterprise-specific configuration information 139 downloaded from NMS 130. In accordance with one specific implementation, a computing device is part of each of NAC systems 180. In accordance with other implementations, each of NAC systems 180A-180K may comprise one or more computing devices, dedicated servers, virtual machines, containers, services, or other forms of environments for performing the techniques described herein.

In order to gain access to wireless networks 106, one or more of UEs 148 may first need to authenticate to NAS devices 108. For example, authentication may occur via a handshake exchange between UE 148A-1, one of NAS devices 108A, and AAA service 110A at NAC system 180A. However, issues may arise with AAA service 110A that prevent UE 148A-1 from gaining access to wireless network 106A. In some cases, these issues may be a result of seemingly unrelated configuration changes and/or updates to network 106A, NAS devices 108A, and/or policies applied to network 106A or NAS devices 108A, e.g., via firewall 114A, such that an administrator associated with site 102A may not be aware that such changes or updates would or could impact AAA service 110A.

In general, this disclosure describes one or more techniques for NMS 130 to detect issues associated with cloud-based AAA services 110 and determine remediation actions to resolve the detected issues. According to the disclosed techniques, NMS 130 is configured to detect the issues based on data indicative of authentication attempts for client devices with AAA service 110 that is obtained for NAS devices 108 at sites 102. The data may be indicative of either or both of actual authentication attempts for real client devices, e.g., client devices 148A at site 102A, or authentication tests for simulated client devices, e.g., simulated network instance 144 of AP 142A-1 at site 102A. NMS 130 identifies whether errors occurred for the authentication attempts and determines whether the errors are indicative of an issue associated with one of AAA services 110, e.g., a reachability issue associated with AAA service 110A or a functionality issue associated with AAA service 110A. NMS 130 determines a remediation action for the issue associated with AAA service 110A, such as a configuration change at one or more of AAA service 110A, NMS 130, NAC system 180A, or firewalls 114 along a data path from NAS devices 108 at site 102 to AAA service 110.

In some examples, the authentication attempts may be actual authentication attempts originating from a real client device, e.g., client device 148A-1, to a NAS device, e.g., AP 142A-1, which sends an access request on behalf of client device 148 to AAA service 110A. In other examples, NMS 130 may conduct authentication tests across a plurality of NAS devices 108 at sites 102. NMS 130 may provide a software package to one or more NAS devices 108, such as AP 142A-1, to simulate a network instance 144 and perform one or more authentication tests to obtain data indicative of authentication of simulated network instance 144.

In accordance with the disclosed techniques, NMS 130 obtains data for the plurality of NAS devices at a site, e.g., NAS devices 108A at site 102A, that is indicative of authentication attempts (both actual and test) and identifies, based on the data, whether one or more errors occurred for the authentication attempts. The one or more errors may include different error types that are identified through different processes. As one example, NMS 130 may identify transmission errors in which the access requests of the authentication attempts do not reach AAA service 110A based on transmission error reports included in the data obtained for NAS devices 108A. As another example, NMS 130 may identify authentication or authorization errors in which NAS devices 108A receive incorrect responses to the access requests of the authentication attempts from AAA service 110A. In order to determine whether the identified errors are one-off errors associated with particular NAS devices 108A or whether they are indicative of a larger issue associated with AAA service 110A, NMS 130 correlates the one or more errors of the same error type across the plurality of NAS devices 108A at site 102A to determine whether a quantity of the NAS devices that reported or experienced the same type of error satisfies a threshold.

In some examples, traffic on secure connections 182, e.g., a RadSec tunnel or another encrypted tunnel, between NAS devices 108 and cloud-based AAA service 110A may be processed by a firewall, such as on-premises firewall 114A. If firewall 114A is misconfigured, the traffic on secure connections 182, e.g., authentication requests, may not reach AAA service 110A. This may result in transmission errors for one or more NAS devices 108A and indicate a reachability issue associated with AAA service 110A. In one example, NMS 130 may correlate transmission errors across NAS devices 108A at site 102A and determine that a quantity of NAS devices 108A reporting the transmission errors satisfies a threshold and is thus indicative of a reachability issue associated with AAA service 110A, such as a configuration issue at firewall 114A between NAS devices 108A and cloud-based AAA service 110A.

In another example, NMS 130 may correlate authentication or authorization errors across NAS devices 108A at site 102A and determine that a quantity of NAS devices 108A experiencing the authentication or authorization errors satisfies a threshold and are thus indicative of a functionality issue associated with AAA service 110A, such as a configuration issue or an infrastructure issue at cloud-based AAA service 110A.

In either example, based on the determination of an issue associated with AAA service 110A, NMS 130 determines a remediation action. In some examples, NMS 130 may automatically perform the remediation action. In other examples, NMS 130 may send a notification of the remediation action, e.g., to an administrator associated with site 102A. In the case of a reachability issue, the remediation action may include a configuration change at firewall 114A along a data path from NAS devices 108A at site 102A to AAA service 110A to enable access requests of the authentication attempts to reach cloud-based AAA service 110A from NAS devices 108A at site 102A. In the case of a functionality issue, the remediation action may include a recommended work around to enable network access by client devices 148A at stie 102A until the functionality issue is resolved.

The techniques of this disclosure provide one or more technical advantages and practical applications. For example, the techniques enable NMS 130 to determine whether one or more errors have occurred for one or more authentication attempts between NAS devices 108A at site 102A and cloud-based AAA service 110A, whether the one or more errors are indicative of an issue associated with AAA service 110A, and a remediation action to correct the issue. NMS 130 may preemptively determine that there is an issue associated with AAA service 110A and determine an action to remediate the issue before an actual client device encounters the issue and without the administrator needing to manually test and/or troubleshoot AAA service 110A to determine the issue. For example, NMS 130 may initiate authentication tests at site 102A to simulate the consistent occurrence of authentication attempts, even during natural downtimes at site 102A, and continually test the reachability and functionality of cloud-based AAA service 110A against configuration changes and/or updates. In this way, the techniques of this disclosure potentially prevent network performance issues that may negatively impact an end user of the network.

Further, to achieve technical efficiencies, the techniques include training and maintenance of machine learning (ML)-based models. In one example, the techniques include an anomaly detection ML-based model to identify the occurrence of certain types of errors from authentication data for NAS devices 108. In another example, the techniques include a correlation ML-based model to correlate the identified errors of a certain type across the plurality of NAS devices 108 to determine a quantity of NAS devices 108 experiencing and/or reporting the same error type. The use of ML-based models may reduce or eliminate the need for human subject matter experts to determine whether one or more errors have occurred and correlate the one or more errors of the same type across the plurality of NAS devices 108 at one of sites 102.

Figure 2:
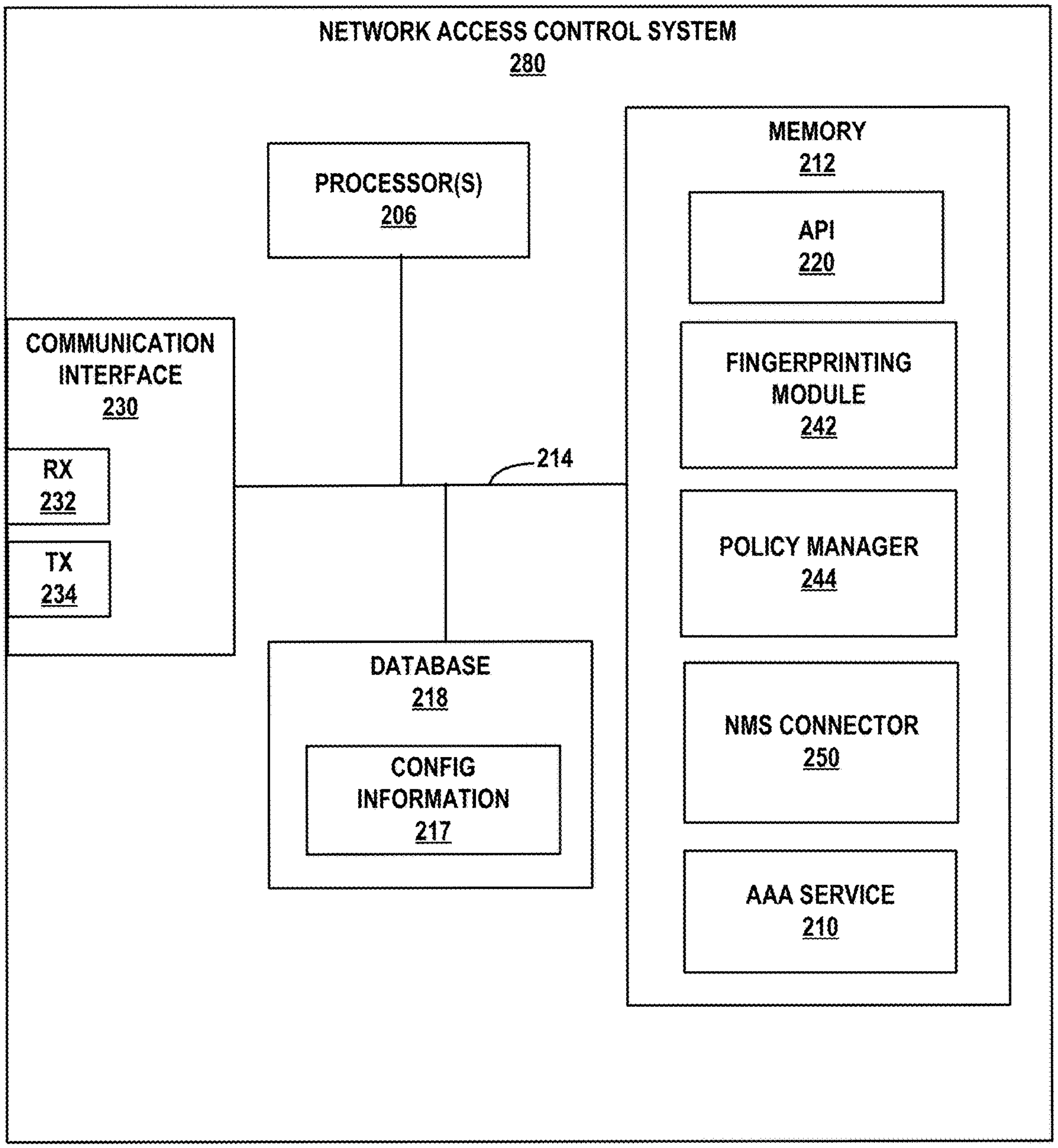
FIG. 2 is a block diagram of an example network access control system, in accordance with one or more techniques of this disclosure.

FIG. 2 is a block diagram of an example network access control (NAC) system 280, in accordance with one or more techniques of the disclosure. NAC system 280 may be used to implement, for example, any of NAC systems 180 in FIGS. 1A, 1B. In such examples, NAC system 280 includes authentication, authorization, and accounting (AAA) service 210 for authenticating and authorizing one or more client devices 148 to access enterprise wireless networks 106 at a sub-set of nearby enterprise sites 102A-102N.

NAC system 280 includes a communications interface 230, one or more processor(s) 206, a memory 212, and a database 218. The various elements are coupled together via a bus 214 over which the various elements may exchange data and information. In some examples, NAC system 280 receives network access requests from one or more of client devices 148 through NAS devices 108 (and in some cases edge devices 150) at the sub-set of nearby enterprise sites 102 from FIGS. 1A, 1B. In response to the network access requests, NAC system 280 authenticates the requesting client devices. In some examples, NAC system 280 enforces appropriate access policies on the authenticated client devices in accordance with enterprise-specific configuration information 217 downloaded from NMS 130 from FIGS. 1A, 1B. In some examples, NAC system 280 may be part of another server shown in FIGS. 1A, 1B or a part of any other server.

Processor(s) 206 execute software instructions, such as those used to define a software or computer program, stored to a computer-readable storage medium (such as memory 212), such as non-transitory computer-readable mediums including a storage device (e.g., a disk drive, or an optical drive) or a memory (such as Flash memory or RAM) or any other type of volatile or non-volatile memory, that stores instructions to cause the one or more processors 206 to perform the techniques described herein.

Communications interface 230 may include, for example, an Ethernet interface. Communications interface 230 couples NAC system 280 to a network and/or the Internet, such as any of network 134 as shown in FIG. 1A and/or any local area networks. Communications interface 230 includes a receiver 232 and a transmitter 234 by which NAC system 280 receives/transmits data and information to/from any of APs 142, switches 146, routers 147, edge devices 150, NMS 130, or servers 110, 116, 122, 128 and/or any other network nodes, devices, or systems forming part of network system 100 such as shown in FIGS. 1A, 1B.

The data and information received by NAC system 280 may include, for example, configuration information 217 associated with one or more of enterprise sites 102 that is downloaded from NMS 130. Configuration information 217 may include enterprise-specific NAC configuration information, including access policies and associated policy assignment criteria. For example, configuration information 217 may define certain virtual local area networks (VLANs), access control lists (ACLs), registration portals, or the like, associated with certain categories of client devices. Configuration information 217 may further define, for each of the different categories of the client devices, different types of tracking, different types of authorization, and/or different levels of access privileges. In addition, the data and information received by NAC system 280 may include identification information of client devices 148 from NAS devices 108 that is used by NAC system 280 to perform fingerprinting of the end user devices in order to enforce the access policies as defined in configuration information 217. NAC system 280 may further transmit data and information via communications interface 230 to NMS 130 including, for example, NAC event data, which may be used by NMS 130 to remotely monitor the performance of NAC system 280.

Memory 212 includes one or more devices configured to store programming modules and/or data associated with operation of NAC system 280. For example, memory 212 may include a computer-readable storage medium, such as a non-transitory computer-readable medium including a storage device (e.g., a disk drive, or an optical drive) or a memory (such as Flash memory or RAM) or any other type of volatile or non-volatile memory, that stores instructions to cause the one or more processor(s) 206 to perform the techniques described herein.

In this example, memory 212 includes AAA service 210, an API 220, a fingerprinting module 242, a policy manager 244, and an NMS connector 250. NAC system 280 may also include any other programmed modules, software engines and/or interfaces configured for authentication and authorization of client devices 148.

AAA service 210 enables authentication of client devices 148 at NAS devices 108 to access wireless networks 106, such as branch or campus enterprise networks, at the sub-set of enterprise sites 102 in communication with NAC system 280. AAA service 210 may perform the functionality of a AAA server, e.g., a RADIUS server, or provide access to an AAA server to authenticate client devices 148 prior to providing access to the enterprise wireless networks 106 via the NAS devices 108. In some examples, AAA service 210 may participate in a handshake exchange between a client device, a NAS device, and NAC system 280 controlling access at the NAS device. In other examples, AAA service 210 may enable certificate-based authentication of client devices or enable interaction with directory services, e.g., an active directory, to authenticate the client devices.

Fingerprinting module 242 enables identification of client devices 148 used to provide the client devices with appropriate authorizations or access policies based on their identities or categorizations. Fingerprinting module 242 may identify client devices 148 by analyzing network behavior of the client devices. Fingerprinting module 242 may receive the network behavior data of the client devices from the NAS devices 108 and/or edge devices 150 in communication with NAS system 280. For example, fingerprinting module 242 may perform fingerprinting of client devices 148 based on one or more of MAC addresses, DHCP options used to request IP addresses, LLDP packets, HTTP user agent information, location information, DNS information, and/or device type and operating system information.

Policy manager 244 enables enforcement of the authorizations or access policies based on the identities or categorizations of the authenticated client devices. For example, policy manager 244 may assign the authenticated client devices to certain VLANs, apply certain ACLs, direct the client devices to certain registration portals, or the like, that are each associated with different types of tracking, different types of authorization, and/or different levels of access privileges in accordance with configuration information 217 for the corresponding enterprise of the client devices. In some examples, after a client device gains access to the enterprise network, policy manger 244 may monitor activities of the client device to identify security concerns and, in response, re-assign the client device to a quarantine VLAN or another less privileged VLAN to restrict access of the client device.

NMS connector 250 manages the data and information exchanged between NAC system 280 and NMS 130, e.g., via a WebSockets or another secure tunnel 184, as shown in FIG. 1B. NMS connector 250 may maintain a log or mapping of which enterprise networks are served by NAC system 280 and the corresponding configuration information 217 for those enterprises. NMS connector 250 may also manage any updates or modifications to configuration information 217 received from NMS 130.

In accordance with the disclosed techniques, based on a determination of an issue associated with AAA service 210, NMS 130 determines a remediation action for the issue associated with AAA service 210, such as a configuration change at one or more of AAA service 210, NMS 130, NAC system 280, or a firewall along a data path from the NAS devices at the site to cloud-based AAA service 210. In some examples, NAC system 280/AAA service 210 may receive instructions from NMS 130, via NMS connector 250, to update configuration information 217 or perform another action to remediate the issue associated with AAA service 210.

Figure 3:
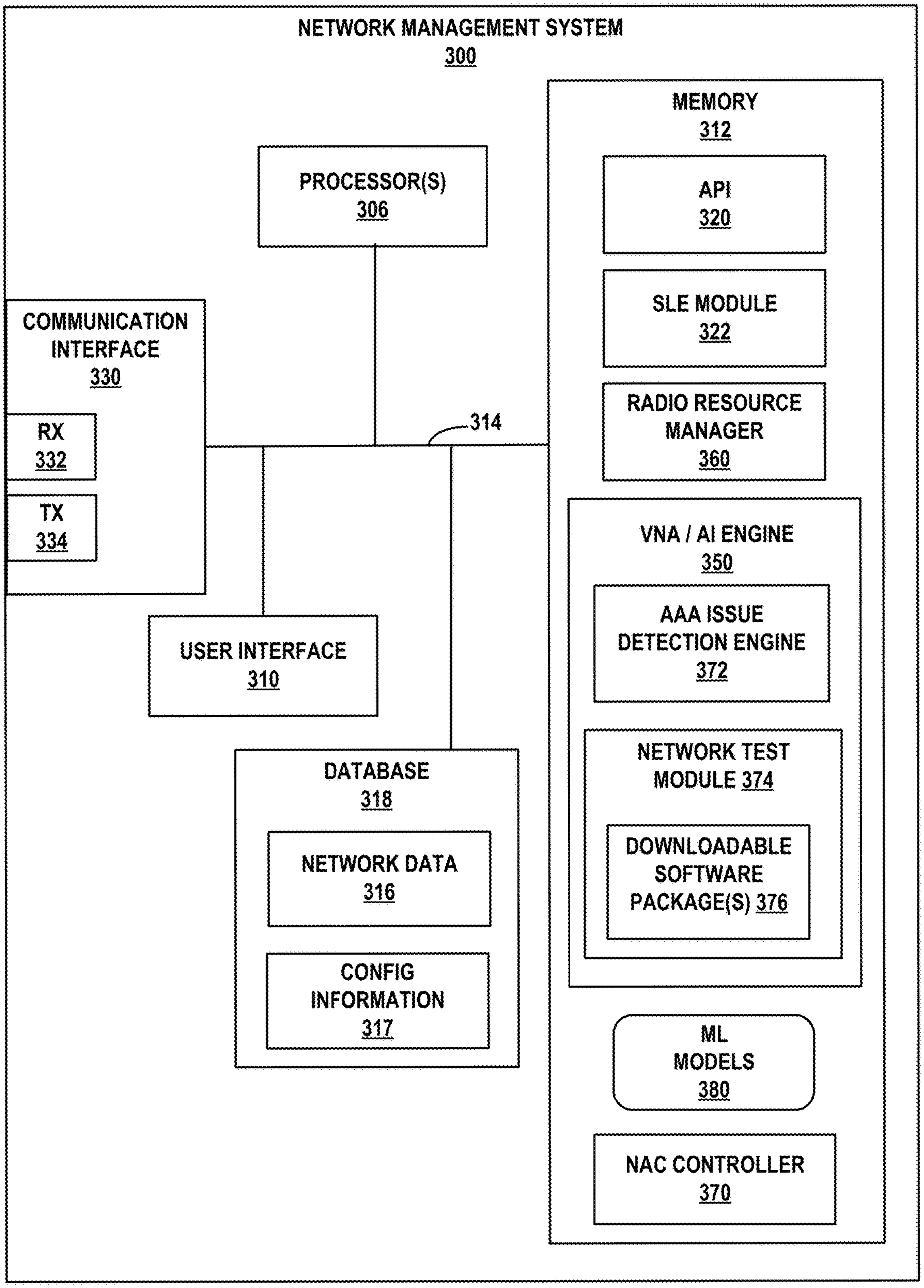
FIG. 3 is a block diagram of an example network management system, in accordance with one or more techniques of the disclosure.

FIG. 3 is a block diagram of an example network management system (NMS) 300, in accordance with one or more techniques of the disclosure. NMS 300 may be used to implement, for example, NMS 130 in FIGS. 1A, 1B. In such examples, NMS 300 is responsible for monitoring and management of one or more wireless networks 106A-106N at sites 102A-102N, respectively.

NMS 300 includes a communications interface 330, one or more processor(s) 306, a user interface 310, a memory 312, and a database 318. The various elements are coupled together via a bus 314 over which the various elements may exchange data and information. In some examples, NMS 300 receives data from one or more of client devices 148, APs 142, switches 146, routers, 147, edge devices 150, NAC systems 180, and other network nodes within network 134, e.g., routers and gateway devices, which may be used to calculate one or more SLE metrics and/or update network data 316 in database 318. NMS 300 analyzes this data for cloud-based management of wireless networks 106A-106N. In some examples, NMS 300 may be part of another server shown in FIG. 1A or a part of any other server.

Processor(s) 306 execute software instructions, such as those used to define a software or computer program, stored to a computer-readable storage medium (such as memory 312), such as non-transitory computer-readable mediums including a storage device (e.g., a disk drive, or an optical drive) or a memory (such as Flash memory or RAM) or any other type of volatile or non-volatile memory, that stores instructions to cause the one or more processors 306 to perform the techniques described herein.

Communications interface 330 may include, for example, an Ethernet interface. Communications interface 330 couples NMS 300 to a network and/or the Internet, such as any of network(s) 134 as shown in FIG. 1A, and/or any local area networks. Communications interface 330 includes a receiver 332 and a transmitter 334 by which NMS 300 receives/transmits data and information to/from any of client devices 148, APs 142, switches 146, routers 147, edge devices 150, NAC systems 180, servers 110, 116, 122, 128 and/or any other network nodes, devices, or systems forming part of network system 100 such as shown in FIG. 1A. In some scenarios described herein in which network system 100 includes "third-party" network devices that are owned and/or associated with different entities than NMS 300, NMS 300 does not directly receive, collect, or otherwise have access to network data from the third-party network devices. In some examples, an edge device, such as edge devices 150 from FIGS. 1A, 1B, may provide a proxy through which the network data of the third-party network devices may be reported to NMS 300.

The data and information received by NMS 300 may include, for example, telemetry data, SLE-related data, or event data received from one or more of client device APs 148, APs 142, switches 146, routers 147, edge devices 150, NAC systems 180, or other network nodes, e.g., routers and gateway devices, used by NMS 300 to remotely monitor the performance of wireless networks 106A-106N and application sessions from client device to cloud-based application server. NMS 300 may further transmit data via communications interface 330 to any of the network devices, such as client devices 148, APs 142, switches 146, routers 147, edge devices 150, NAC systems 180, or other network nodes within network 134, to remotely manage wireless networks 106A-106N and portions of the wired network.

Memory 312 includes one or more devices configured to store programming modules and/or data associated with operation of NMS 300. For example, memory 312 may include a computer-readable storage medium, such as a non-transitory computer-readable medium including a storage device (e.g., a disk drive, or an optical drive) or a memory (such as Flash memory or RAM) or any other type of volatile or non-volatile memory, that stores instructions to cause the one or more processor(s) 306 to perform the techniques described herein.

In this example, memory 312 includes an API 320, an SLE module 322, a virtual network assistant (VNA)/AI engine 350, a radio resource management (RRM) engine 360, and a NAC controller 370. NMS 300 may also include any other programmed modules, software engines and/or interfaces configured for remote monitoring and management of wireless networks 106A-106N and portions of the wired network, including remote monitoring and management of any of APs 142, switches 146, routers 147, edge devices 150, NAC systems 180, or other network devices, e.g., routers and gateway devices.

SLE module 322 enables set up and tracking of thresholds for SLE metrics for each network 106A-106N. SLE module 322 further analyzes SLE-related data collected by, e.g., APs, such as any of APs 142 from UEs in each wireless network 106A-106N. For example, APs 142A-1 through 142A-N collect SLE-related data from UEs 148A-1 through 148A-N currently connected to wireless network 106A. This data is transmitted to NMS 300, which executes by SLE module 322 to determine one or more SLE metrics for each UE 148A-1 through 148A-N currently connected to wireless network 106A. This data, in addition to any network data collected by one or more APs 142A-1 through 142A-N in wireless network 106A, is transmitted to NMS 300 and stored as, for example, network data 316 in database 318.

RRM engine 360 monitors one or more metrics for each site 102A-102N in order to learn and optimize the RF environment at each site. For example, RRM engine 360 may monitor the coverage and capacity SLE metrics for a wireless network 106 at a site 102 in order to identify potential issues with SLE coverage and/or capacity in the wireless network 106 and to make adjustments to the radio settings of the access points at each site to address the identified issues. For example, RRM engine may determine channel and transmit power distribution across all APs 142 in each network 106A-106N. For example, RRM engine 360 may monitor events, power, channel, bandwidth, and number of clients connected to each AP. RRM engine 360 may further automatically change or update configurations of one or more APs 142 at a site 102 with an aim to improve the coverage and capacity SLE metrics and thus to provide an improved wireless experience for the user.

VNA/AI engine 350 analyzes data received from network devices as well as its own data to identify when undesired to abnormal states are encountered at one of the network devices. For example, VNA/AI engine 350 may identify the root cause of any undesired or abnormal states, e.g., any poor SLE metric(s) indicative of connected issues at one or more network devices. In addition, VNA/AI engine 350 may automatically invoke one or more corrective actions intended to address the identified root cause(s) of one or more poor SLE metrics. In some examples, ML models 380 may comprise a supervised ML model that is trained, using training data comprising pre-collected, labeled network data received from the network devices. The supervised ML model may comprise one of a logistical regression, naïve Bayesian, support vector machine (SVM), or the like. In other examples, ML models 380 may comprise an unsupervised ML model. Although not shown in FIG. 3, in some examples, database 318 may store the training data and VNA/AI engine 350 or a dedicated training module may be configured to train ML models 380 based on the training data to determine appropriate weights across the one or more features of the training data.

Examples of corrective actions that may be automatically invoked by VNA/AI engine 350 may include, but are not limited to, correcting policy configurations, correcting firewall configurations, invoking RRM 360 to reboot one or more APs, adjusting/modifying the transmit power of a specific radio in a specific AP, adding SSID configuration to a specific AP, changing channels on an AP or a set of APs, etc. The corrective actions may further include restarting a switch and/or a router, invoking downloading of new software to an AP, switch, or router, etc. These corrective actions are given for example purposes only, and the disclosure is not limited in this respect. If automatic corrective actions are not available or do not adequately resolve the root cause, VNA/AI engine 350 may proactively provide a notification including recommended corrective actions to be taken by IT personnel, e.g., a site or network administrator using admin device 111, to address the network error.

NAC controller 370 implements a NAC configuration platform that provides user interface 310 for display to an enterprise network administrator, e.g., via admin device 111 of FIG. 1A, through which to receive access policy information for the enterprise network. NAC controller 370 creates enterprise-specific configuration information 317 stored in database 318 based on the input received via user interface 310. Configuration information 317 may include NAC configuration information for one or more enterprise networks managed by NMS 300. For each enterprise, configuration information 317 may including access policies and associated policy assignment criteria. For example, configuration information 317 may define certain VLANs, ACLs, registration portals, or the like, associated with certain categories of client devices, and may further define, for each of the different categories of the client devices, different types of tracking, different types of authorization, and/or different levels of access privileges. Configuration information 317 may be substantially similar to configuration information 139 of FIG. 1B.

NAC controller 370 manages the data and information exchanged between NMS 300 and NAC systems 180, e.g., via WebSockets or other secure tunnels 184, as shown in FIG. 1B. NAC controller 370 may maintain a log or mapping of which enterprise networks are served by which of NAC systems 180 and the corresponding configuration information 317 for those enterprises. NAC controller 370 may also manage any updates or modifications to configuration information 317 to be pushed down to NAC systems 180. In addition, NAC controller 370 may monitor NAC systems 180 to identify failures of primary NAC systems and manage failovers to standby NAC systems.

In accordance with one or more techniques of this disclosure, VNA/AI engine 350 includes AAA issue detection engine 372. AAA issue detection engine 372 may determine whether an error associated with a cloud-based AAA service has occurred for either an actual or test authentication attempt of a client device via a NAS device at a site.

In some examples, NMS 300 may obtain data indicative of authentication attempts for client devices with a AAA service. The data may be included in network data 316 stored in database 318. NMS 300 may obtain data indicative of authentication attempts from NAS devices as client devices attempt to initiate an AAA session with the AAA service. To ensure that NMS 300 is consistently obtaining data indicative of authentication attempts, NMS 300 may initiate authentication tests that generate data indicative of authentication attempts between a simulated network instance or client device and a AAA service.

VNA/AI engine 350 includes network test module 374 which includes downloadable software packages 376. In one example, to initiate an authentication test, network test module 374 is configured to select and/or provide a downloadable software package 376 to one or more NAS devices, such as APs, to enable the APs to simulate a network instance to obtain data indicative of authentication of the network instance. NMS 300 may receive the data indicative of the authentication attempt of the network instance from the APs as part of network data 316, NMS 300 may analyze the data to determine an error associated with the cloud-based AAA service.

In one example, NMS 300 may select a software package from downloadable software packages 376, wherein the selected software package includes instructions for simulating a client device such that the simulated client device attempts to initiate an AAA session with an AAA service. NMS 300 may then send the selected software package to at least one NAS device at a site to cause the NAS device to simulate the client device. NMS 300 may then obtain the data from the NAS devices indicative of the authentication attempts for the simulated client device with the AAA service.

In one example, NMS 300 may initiate authentication tests at one or more NAS devices at a site. In another example, NMS 300 may initiate authentication tests across a quantity of NAS devices at a site and then, based on the data obtained from the authentication tests, NMS 300 may initiate additional authentication tests across an increased quantity of NAS devices.

In some examples, each of downloadable software packages 376 includes one or more of an authentication test to be performed by the simulated network instance, configuration data for a communication channel to be established with NMS 300 for transmitting authentication test data, a schedule to perform the authentication tests, a Virtual Local Area Network (VLAN) to be used during performance of the authentication tests, or one or more resource requirements to be applied during performance the authentication tests. Downloadable software packages 376 may include instructions for causing a NAS device to perform an authentication test. For example, downloadable software package 376 may include instructions for causing an AP to perform an authentication test by simulating a network instance that attempts to initiate an AAA session with an AAA service. Network test module 374 sends to the AP (or the AP obtains from network test module 374), the selected software package to cause the AP to simulate a network instance, e.g., a client device, to obtain data indicative of an authentication test.

Although authentication tests are described in some examples as being performed by a network instance of an AP, authentication tests may be performed by other network instances of other devices, such as switches, routers, or edge devices.

Further example details and techniques of simulating a network instance to obtain data indicative of performance of the network instance is described in India Provisional Application No. 202441038170, entitled "Downloadable Network Tests For Virtual Clients Functions," which is hereby incorporated by reference.

In another example, downloadable software packages 376 may include specific software packages to obtain data indicative of a specific aspect of authentication attempts with a AAA service. For example, a software package for one authentication test may include valid credentials in the authentication request to obtain data indicative of the functionality of a AAA service, whereas a software package for another authentication test may not need to include any credentials in the authentication request to obtain data indicative of reachability of the AAA service.

NMS 300 may store data indicative of authentication attempts from either actual or test authentication attempts in network data 316. NMS 300 may also maintain and store data indicative of past actual or test authentication attempts in network data 316, such as past error reports and past responses from AAA services. AAA issue detection engine 372 may receive the data indicative of authentication attempts from network data 316 via bus 314. AAA issue detection engine 372 may then identify, based on the data indicative of authentication attempts, whether one or more errors occurred for the authentication attempts. The one or more errors may include different error types, such as transmission errors or authentication or authorization errors.

In one example, AAA issue detection engine 372 may obtain the data indicative of the authentication attempts for client devices and that data may include one or more transmission error reports. AAA issue detection engine 372 may be configured to identify, from the one or more transmission error reports in the data, that one or more transmission errors occurred for the authentication attempts. Occurrence of a transmission error may indicate that access requests of the authentication attempts for the corresponding client devices are not reaching the AAA service, which may result in the client devices being unable to access the enterprise network. The transmission error report may include further details for AAA issue detection engine 372 to determine the issue associated with the reachability of the AAA service.

Further, AAA issue detection engine 372 may be configured to determine that the one or more transmission errors are indicative of a reachability issue associated with the AAA service. The reachability issue may be caused by a configuration at a firewall along a data path from one or more of NAS devices at the site to the cloud-based AAA service. In one example, a firewall may be misconfigured such that an L4 connection cannot be established between a NAS device and a NAC system or other server hosting the AAA service.

In another example, the L4 connection may be established, but encryption features of the firewall may cause the access requests of the authentication attempts to fail at the firewall before reaching the AAA service at the NAC system or other server hosting the AAA service. For instance, secure sockets layer (SSL) encryption may be enabled on a port of the firewall that is receiving the access requests of the authentication attempts for a client device from a NAS device. The firewall may send its certificate to the NAS device from which the access request was received, but the NAS device may not acknowledge the certificate, e.g., the NAS device may only recognize a certification of NMS 300. When the NAS device fails to acknowledge the certificate of the firewall, the firewall will drop the access requests.

Additional examples may exist where the reachability issue associated with AAA service 110 is not caused by the configuration at a firewall along the data path from one or more NAS devices to a NAC system or other server hosting the AAA service. For example, the reachability issue may be caused by a routing issue that results in the access requests of the authentication attempts to be routed to an incorrect location, i.e., not the NAC system or other server hosting the AAA service. Regardless of what causes a reachability issue, a reachability issue associated with AAA service 110 may prevent access requests of authentication attempts for client devices from reaching a AAA service and, thus, may cause one or more end users to experience one or more transmission errors.

In another example, when one or more client devices attempt to access a network, authentication may occur via a handshake exchange between client devices, NAS devices, and a AAA service that is controlling access at the NAS devices. During this handshake, a NAS device may receive a response to an access request for a client device from the AAA service. In one example, the response may be a lack of response (i.e., no response received from the AAA server). In another example, the response may be an "accept" indicating that the AAA service has accepted the access request. In another example, the response may be a "reject" indicating that the AAA service has rejected the access request. Further, a response to the access request from the AAA service may include parameters, such as a particular VLAN, e.g., VLAN 10 or VLAN 20.

AAA issue detection engine 372 may obtain the data indicative of authentication attempts for client devices and the data may include one or more responses from AAA services (e.g., "accept," "reject," parameters, etc.). AAA issue detection engine 372 may be configured to compare the one or more responses in the data to one or more expected responses for the client devices. The expected responses may be determined based on configuration information 317, which includes access policies and associated policy assignment criteria, including definitions of certain VLANs, ACLs, registration portals, or the like, associated with certain categories of client devices. AAA issue detection engine 372 may, based on the comparison of the one or more responses in the data to one or more expected responses, identify whether one or more authentication or authorization errors occurred for the authentication attempts. For example, in some scenarios, the response from the AAA service may include an "accept" when the response should have been "reject" based on configuration information 317 or may include a "reject" when the response should have been "accept" based on configuration information 317. In other examples, the response from the AAA service may include a correct "accept" response but with incorrect parameters (e.g., assigning the client device to VLAN 20 instead of VLAN 10 as specified by configuration parameters 317). In some examples, AAA issue detection engine 372 may use one or more ML models 380 to identify one or more transmission and/or authentication or authorization errors from the data indicative of authentication attempts.

In one example, AAA issue detection engine 372 may obtain data that includes a lack of response, and the expected response may be an "accept" response. AAA issue detection engine 372 may compare the lack of response with the "accept" response and identify that an authentication or authorization error occurred for the authentication attempt. In another example, AAA issue detection engine 372 may obtain data that includes an "accept" response, and the expected response may be a "reject" response. AAA issue detection engine 372 may compare the "accept" and "reject" responses and identify that an authentication or authorization error occurred for the authentication attempt. In another example, AAA issue detection engine 372 may obtain data that includes a "reject" response, and the expected response may be an "accept" response. AAA issue detection engine 372 may compare the "reject" and "accept" responses and identify that an authentication or authorization error occurred for the authentication attempt. In another example, AAA issue detection engine 372 may obtain data that includes an "accept" response with parameters VLAN 10, and the expected response may be an "accept" with parameters VLAN 20. AAA issue detection engine 372 may compare the responses and identify that, based on the difference in parameters, an authentication or authorization error has occurred for the authentication attempt. In another example, AAA issue detection engine may obtain data that includes an "accept" response, and the expected response may be an "accept" response. AAA issue detection engine 372 may compare the "accept" and "accept" response and identify that no authentication or authorization error occurred for the authentication attempt.

Further, AAA issue detection engine 372 may be configured to determine that the one or more authentication or authorization errors are indicative of a functionality issue associated with the AAA service. The functionality issue may be caused by at least one of a configuration issue or an infrastructure issue at the AAA service. In one example, the functionality issue may be caused by an administrator of a network misconfiguring one or more policies at the AAA service. In another example, the functionality issue may be caused by an infrastructure issue due to the AAA service not being able to access information, such as a locally accessible cache that contains policy information and/or a cloud-based service, such as an identity provider (IDP) service, that contains identity information and/or device information for the client devices.

To determine whether the one or more errors (e.g., transmission errors or authentication or authorization errors) identified based on the data indicative of authentication attempts are indicative of an issue associated with the AAA service (such as a reachability or functionality issue), AAA issue detection engine 372 may be configured to correlate the one or more errors across the plurality of NAS devices at a site. In one example, AAA issue detection engine 372 may use a correlation ML model from ML models 380 to identify errors of a certain type across the plurality of NAS devices. The correlation may determine a quantity of NAS devices experiencing and/or reporting the same error type. AAA issue detection engine 372 may then compare the quantity of NAS devices experiencing the same error type against a threshold to determine whether the quantity of NAS devices indicates a larger issue associated with the AAA service, as opposed to a more localized issue at a single NAS device at the site. For example, a localized issue at a single NAS device at the site may be a result of a customer configuration issue.

In some examples, AAA issue detection engine may use ML models 380 to determine the threshold value to which the correlated quantity of NAS devices is compared for each error type. In other examples, the threshold value may be a static value that may be different for each error type. For example, the threshold value for transmission errors may be different than the threshold value for authentication or authorization errors. The threshold value may be specific to each enterprise or be standardized across multiple enterprises. In one example, the threshold value may change depending on the number of AAA servers available for a network.

In one example, AAA issue detection engine 372 may determine a quantity of NAS devices from the plurality of NAS devices that reported or experienced a first type of error associated with the AAA service. AAA issue detection engine 372 may then compare the quantity of NAS devices against one of the corresponding thresholds. If the quantity of NAS devices satisfies the corresponding threshold, AAA issue detection engine 372 may determine that the first type of error is indicative of a first issue associated with the AAA service. However, if the quantity of NAS devices does not satisfy the corresponding threshold, AAA issue detection engine 372 may determine that the first type of error is not indicative of a first issue associated with the AAA service but is instead indicative of a localized issue at one or more NAS devices at the site. For example, AAA issue detection engine 372 may determine that five NAS devices from the plurality of NAS devices at the site reported or experienced a transmission error. If AAA issue detection engine 372 determines that the five NAS devices do not satisfy the corresponding transmission error threshold of 80% of the total quantity of NAS devices at the site, then AAA issue detection engine 372 may determine that the transmission error is not indicative of a reachability issue associated with the AAA service. Instead, AAA issue detection engine 372 may determine that the transmission error is indicative of a localized issue at one or more of the five NAS devices at the site that reported or experienced the transmission error.

In this way, AAA issue detection engine 372 may identify errors from data indicative of authentication attempts and then determine if each error type identified is indicative of an issue associated with the AAA service. If the data is indicative of an issue associated with the AAA service, AAA issue detection engine 372 may determine at least one remediation action and send a notification of the at least one remediation action to at least an administrator associated with the corresponding site and/or the enterprise. The remediation action for each issue type associated with the AAA service may be different.

In one example, AAA issue detection engine 372 may determine that the remediation action for a reachability issue associated with the AAA service includes a configuration change at a firewall to enable the access requests of the authentication attempts for the client devices to reach the AAA service. In one example, the configuration change at the firewall may include a policy correction. In another example, the configuration change at the firewall may include disabling encryption features on certain ports of the firewall.

In another example, AAA issue detection engine 372 may determine that the remediation action for a functionality issue associated with the AAA service includes a recommended work around for at least one of a configuration issue or an infrastructure issue at the AAA service. The recommended work around may include using an on-premise AAA server or another cloud-based AAA service until the infrastructure issue at the primary cloud-based AAA service is resolved. In another example, AAA issue detection engine 372 may determine that the remediation action for a functionality issue associated with the AAA service includes a recommended policy change for an administrator to implement on the AAA service.

In some examples, AAA issue detection engine 372 may determine the remediation action and automatically initiate or perform the remediation action to correct the issue associated with the AAA service. AAA issue detection engine 372 may then send a notification to an administrator associated with the corresponding site and/or enterprise indicating that the remediation action was automatically performed.

AAA issue detection engine 372 may automatically perform the techniques of this disclosure to preemptively determine that there is an issue associated with a AAA service and determine an action to remediate the issue before an end user ever encounters the issue and without an administrator needing to manually test and/or troubleshoot the AAA service to determine the issue. In this way, the techniques of this disclosure potentially prevent network performance issues that may have otherwise gone unnoticed until an end user was negatively impacted by these issues. Further, techniques of this disclosure may reduce the need for manual intervention and testing from an administrator, thus increasing cost and time savings.

Although the techniques of the present disclosure are described in this example as performed by NMS 300, techniques described herein may be performed by any other computing device(s), system(s), and/or server(s), and that the disclosure is not limited in this respect. For example, one or more computing device(s) configured to execute the functionality of the techniques of this disclosure may reside in a dedicated server or be included in any other server in addition to or other than NMS 300, or may be distributed throughout network 100, and may or may not form a part of NMS 300.

Figure 4:
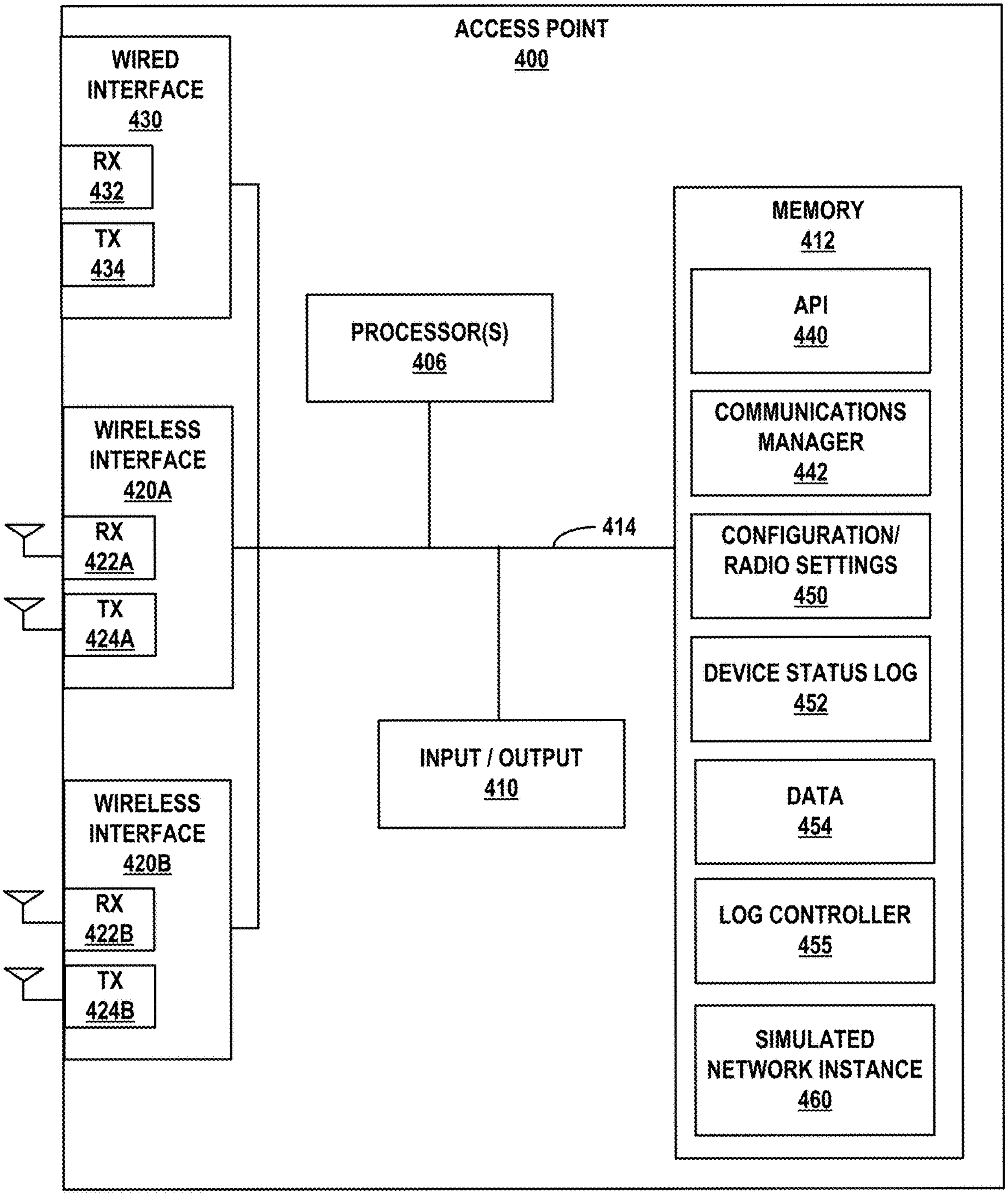
FIG. 4 is a block diagram of an example access point (AP), in accordance with one or more techniques of this disclosure.

FIG. 4 is a block diagram of an example access point (AP) device 400, in accordance with one or more techniques of this disclosure. AP device 400 is just one example of a NAS device 108. Example access point 400 shown in FIG. 4 may be used to implement any of APs 142 as shown and described herein with respect to FIG. 1A. Access point 400 may comprise, for example, a Wi-Fi, Bluetooth and/or Bluetooth Low Energy (BLE) base station or any other type of wireless access point.

In the example of FIG. 4, access point 400 includes a wired interface 430, wireless interfaces 420A-420B one or more processor(s) 406, memory 412, and input/output 410, coupled together via a bus 414 over which the various elements may exchange data and information. Wired interface 430 represents a physical network interface and includes a receiver 432 and a transmitter 434 for sending and receiving network communications, e.g., packets. Wired interface 430 couples, either directly or indirectly, access point 400 to a wired network device, such as one of switches 146 or routers 147 of FIGS. 1A, 1B, within the wired network via a cable, such as an Ethernet cable.

First and second wireless interfaces 420A and 420B represent wireless network interfaces and include receivers 422A and 422B, respectively, each including a receive antenna via which access point 400 may receive wireless signals from wireless communications devices, such as UEs 148 of FIGS. 1A, 1B. First and second wireless interfaces 420A and 420B further include transmitters 424A and 424B, respectively, each including transmit antennas via which access point 400 may transmit wireless signals to wireless communications devices, such as UEs 148 of FIGS. 1A, 1B. In some examples, first wireless interface 420A may include a Wi-Fi 802.11 interface (e.g., 2.4 GHz and/or 5 GHz) and second wireless interface 420B may include a Bluetooth interface and/or a Bluetooth Low Energy (BLE) interface. As described above, AP 400 may request network access for one or more UEs 148 from a nearby NAC system, e.g., NAC system 280 of FIG. 2 or one of NAC systems 180 of FIGS. 1A, 1B.

Processor(s) 406 are programmable hardware-based processors configured to execute software instructions, such as those used to define a software or computer program, stored to a computer-readable storage medium (such as memory 412), such as non-transitory computer-readable mediums including a storage device (e.g., a disk drive, or an optical drive) or a memory (such as Flash memory or RAM) or any other type of volatile or non-volatile memory, that stores instructions to cause the one or more processors 406 to perform the techniques described herein.

Memory 412 includes one or more devices configured to store programming modules and/or data associated with operation of access point 400. For example, memory 412 may include a computer-readable storage medium, such as non-transitory computer-readable mediums including a storage device (e.g., a disk drive, or an optical drive) or a memory (such as Flash memory or RAM) or any other type of volatile or non-volatile memory, that stores instructions to cause the one or more processor(s) 406 to perform the techniques described herein.

In this example, memory 412 stores executable software including an application programming interface (API) 440, a communications manager 442, configuration settings 450, a device status log 452, data storage 454, log controller 455, and simulated network instance 460. Device status log 452 includes a list of events specific to access point 400. The events may include a log of both normal events and error events such as, for example, memory status, reboot or restart events, crash events, cloud disconnect with self-recovery events, low link speed or link speed flapping events, Ethernet port status, Ethernet interface packet errors, upgrade failure events, firmware upgrade events, configuration changes, etc., as well as a time and date stamp for each event. Log controller 455 determines a logging level for the device based on instructions from NMS 130. Data 454 may store any data used and/or generated by access point 400, including data collected from UEs 148, such as data used to calculate one or more SLE metrics, that is transmitted by access point 400 for cloud-based management of wireless networks 106A by NMS 130/300.

Input/output (I/O) 410 represents physical hardware components that enable interaction with a user, such as buttons, a display, and the like. Although not shown, memory 412 typically stores executable software for controlling a user interface with respect to input received via I/O 410. Communications manager 442 includes program code that, when executed by processor(s) 406, allow access point 400 to communicate with UEs 148 and/or network(s) 134 via any of interface(s) 430 and/or 420A-420C. Configuration settings 450 include any device settings for access point 400 such as radio settings for each of wireless interface(s) 420A-420C. These settings may be configured manually or may be remotely monitored and managed by NMS 130 to optimize wireless network performance on a periodic (e.g., hourly or daily) basis.

AP 400 may operate substantially similar to one of APs 142 of FIGS. 1A, 1B. For example, AP 400 includes simulated network instance 460, which may operate substantially the same as simulated network instance 144 of AP 142A-1. Simulated network instance 460 may simulate, based on instructions received from an NMS, such as NMS 130 of FIGS. 1A, 1B or NMS 300 of FIG. 3, a client device to obtain data indicative of authentication attempts of the client device with a AAA service. Simulated network instance 460 may be programmed, e.g., based on one or more software packages downloaded from the NMS, to perform an authentication test. Based on the software packages, simulated network instance 460 may perform the authentication test according to one or more defined parameters, such as configuration data for a communication channel, data format for authentication data, a schedule to perform the authentication test, a VLAN to be used during performance of the authentication test, or one or more resource requirements to be applied during performance of the authentication test.

Simulated network instance 460 may simulate or mimic a client device that requests access to a network via AP 400 during a natural downtime of the network, e.g., overnight or weekends, in order to test the AAA service before actual client devices attempt to access the network.

In one example, the network test may comprise an authentication test. In this example, simulated network instance 460 attempts to initiate an AAA session with a cloud-based AAA service. As another example, the network test may comprise a ping test intended to identify a routing issue between AP 400 and the AAA service. In this example, simulated network instance 460 sends a ping toward the NAC system or other server hosing the AAA service. If a routing issue exists, AP 400 will not receive an acknowledgement back from the NAC system or the other server hosing the AAA service.

Simulated network instance 460 may perform the authentication test while AP 400 manages actual network traffic flows and without otherwise interrupting the ordinary forwarding of network traffic by AP 400. Additionally, in some examples, simulated network instance 460 may perform the authentication test based on one or more software packages downloaded from the NMS and, thus, without requiring an update to firmware of AP 400.

AP device 400 may measure and report network data from status log 452 to the NMS. The network data may comprise event data, telemetry data, and/or other SLE-related data. The network data may include various parameters indicative of the performance and/or status of the wireless network. The parameters may be measured and/or determined by one or more of the UE devices and/or by one or more of the APs in a wireless network. In accordance with the techniques of this disclosure, AP 400 may include, in the network data reported to the NMS, data indicative of authentication attempts by real client devices or by simulated network instance 460. In some examples, AP 400 may receive instructions from the NMS to perform an action to remediate an issue associated with the AAA service.

Figure 5:
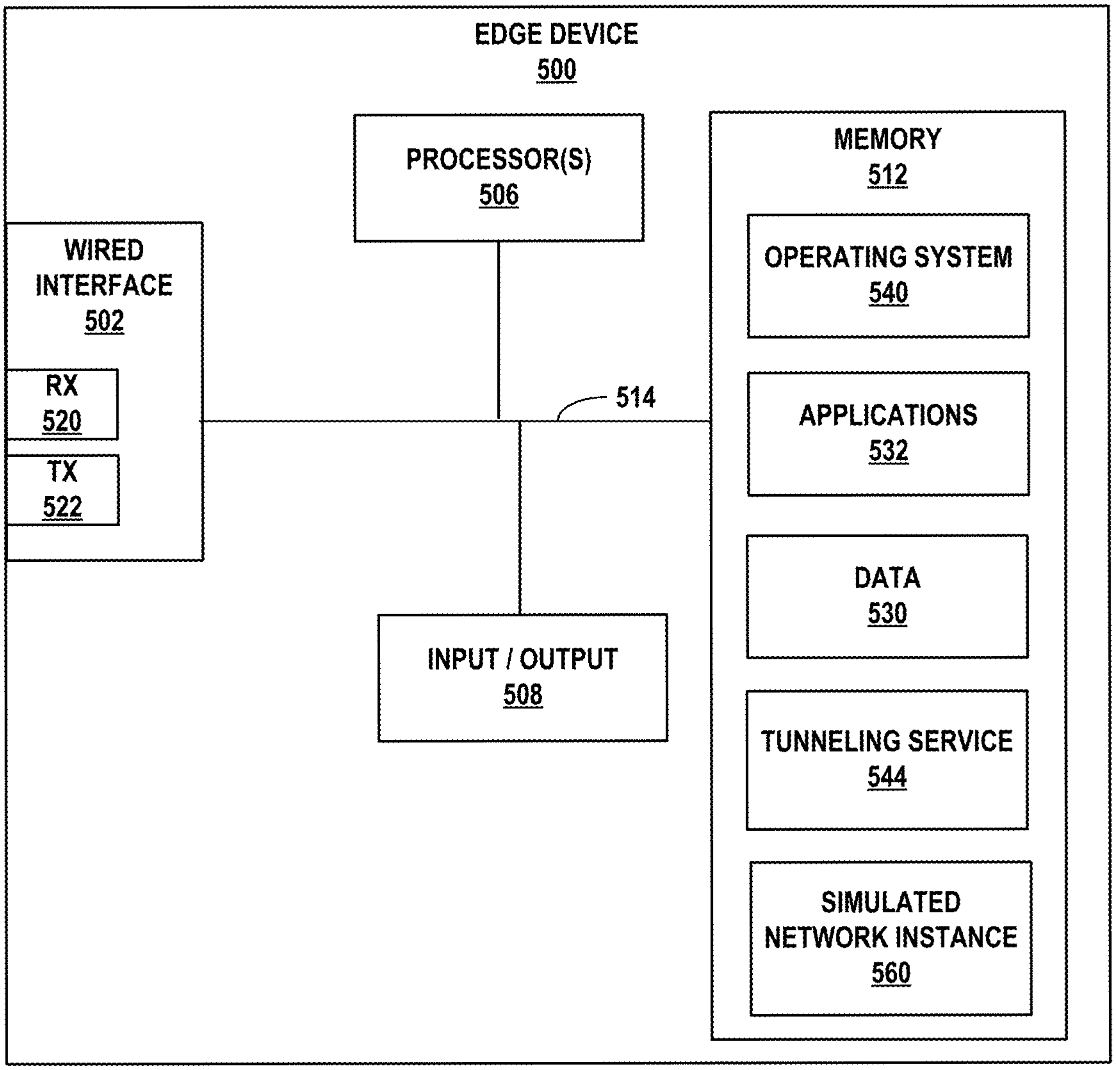
FIG. 5 is a block diagram of an example edge device, in accordance with one or more techniques of this disclosure.

FIG. 5 is a block diagram illustrating an example edge device 500, in accordance with one or more techniques of this disclosure. Edge device 500 comprises a cloud-managed, wireless local area network (LAN) controller. Edge device 500 may be used to implement, for example, any of edge devices 150 in FIGS. 1A, 1B. In such examples, edge device 500 comprises an on-premises device at a site 102 that is in communication with NMS 130 and one or more on-premises NAS devices 108, e.g., one or more APs 142, switches 146, or routers 147, from FIGS. 1A, 1B. Edge device 500 with NMS 130 and may operate to extend certain microservices from NMS 130 to the on-premises NAS devices 108 while using NMS 130 and its distributed software architecture for scalable and resilient operations, management, troubleshooting, and analytics.

In this example, edge device 500 includes a wired interface 502, e.g., an Ethernet interface, a processor 506, input/output 508, e.g., display, buttons, keyboard, keypad, touch screen, mouse, etc., and a memory 512 coupled together via a bus 514 over which the various elements may interchange data and information. Wired interface 502 couples edge device 500 to a network, such as network 134 shown in FIG. 1A and/or any local area networks. Wired interface 502 includes a receiver 520 and a transmitter 522 by which edge device 500 receives/transmits data and information to/from any of NAS devices 108 and NMS 130 and/or NAC systems 180. Though only one interface is shown by way of example, edge device 500 may have multiple communication interfaces and/or multiple communication interface ports.

Memory 512 stores executable software applications 532, operating system 540, data/information 530, tunneling service 544, and simulated network instance 560. Tunneling service 544 provides on-premises tunnel termination from APs and other NAS devices. Tunneling service 544 further provides a secure tunnel proxy to NMS 130 and/or NAC systems 180. Data 530 may include a system log and/or an error log that stores event data, including behavior data, for edge device 500 and devices for which edge device 500 acts as a tunnel terminator, e.g., APs and other NAS devices.

In one scenario, one or more of the NAS devices 108, e.g., switch 146A from FIG. 1B, may not support establishment of secure tunnels, e.g., WebSocket or RadSec tunnels, directly with NMS 130 and/or NAC systems 180. In this scenario, tunneling service 544 of edge device 500 provides a tunnel proxy to, e.g., enable authentication requests received from switch 146A via a secure tunnel 178A to be tunneled to NAC system 180A using a RadSec tunnel 182A, as shown in FIG. 1B, and/or enable network data of switch 146A to be tunneled to NMS 130 using a WebSocket.

In the example of FIG. 5, edge device 500 includes a simulated network instance 560. Simulated network instance 560 may operate substantially similar to simulated network instance 460 of AP 400 of FIG. 4 and/or simulated network instance 144 of AP 142A-1 of FIGS. 1A, 1B. Simulated network instance 560 may simulate, based on instructions received from an NMS, such as NMS 130 of FIGS. 1A, 1B or NMS 300 of FIG. 3, a network instance, e.g., a client device and/or an AP, to obtain data indicative of authentication attempts with a AAA service. Simulated network instance 560 may be programmed, e.g., based on one or more software packages downloaded from the NMS, to perform an authentication test. Based on the software packages, simulated network instance 560 may perform the authentication test according to one or more defined parameters.

Simulated network instance 560 may simulate or mimic a client device and/or an AP or other NAS device requesting network access during a natural downtime of the network, e.g., overnight or weekends, in order to test the AAA service before actual client devices attempt to access the network. Simulated network instance 560 may perform the authentication test while edge device 500 manages actual network traffic flows and without otherwise interrupting the ordinary forwarding of network traffic by edge device 500.

Additionally, in some examples, simulated network instance 560 may perform the authentication test based on one or more software packages downloaded from the NMS and, thus, without requiring an update to firmware of edge device 500.

Edge device 500 may measure and report network data, e.g., data 530, to the NMS. The network data may comprise event data, telemetry data, and/or other SLE-related data. The network data may include various parameters indicative of the performance and/or status of the wireless network. The parameters may be measured and/or determined by one or more of the client devices, by one or more of the APs in a wireless network, and/or by one or more of the NAS devices in a wireless or wired network. In accordance with the techniques of this disclosure, edge device 500 may include, in the network data reported to the NMS, data indicative of authentication attempts by real client devices and APs or by simulated network instance 560. In some examples, edge device 500 may receive instructions from the NMS to perform an action to remediate an issue associated with the AAA service.

Figure 6:
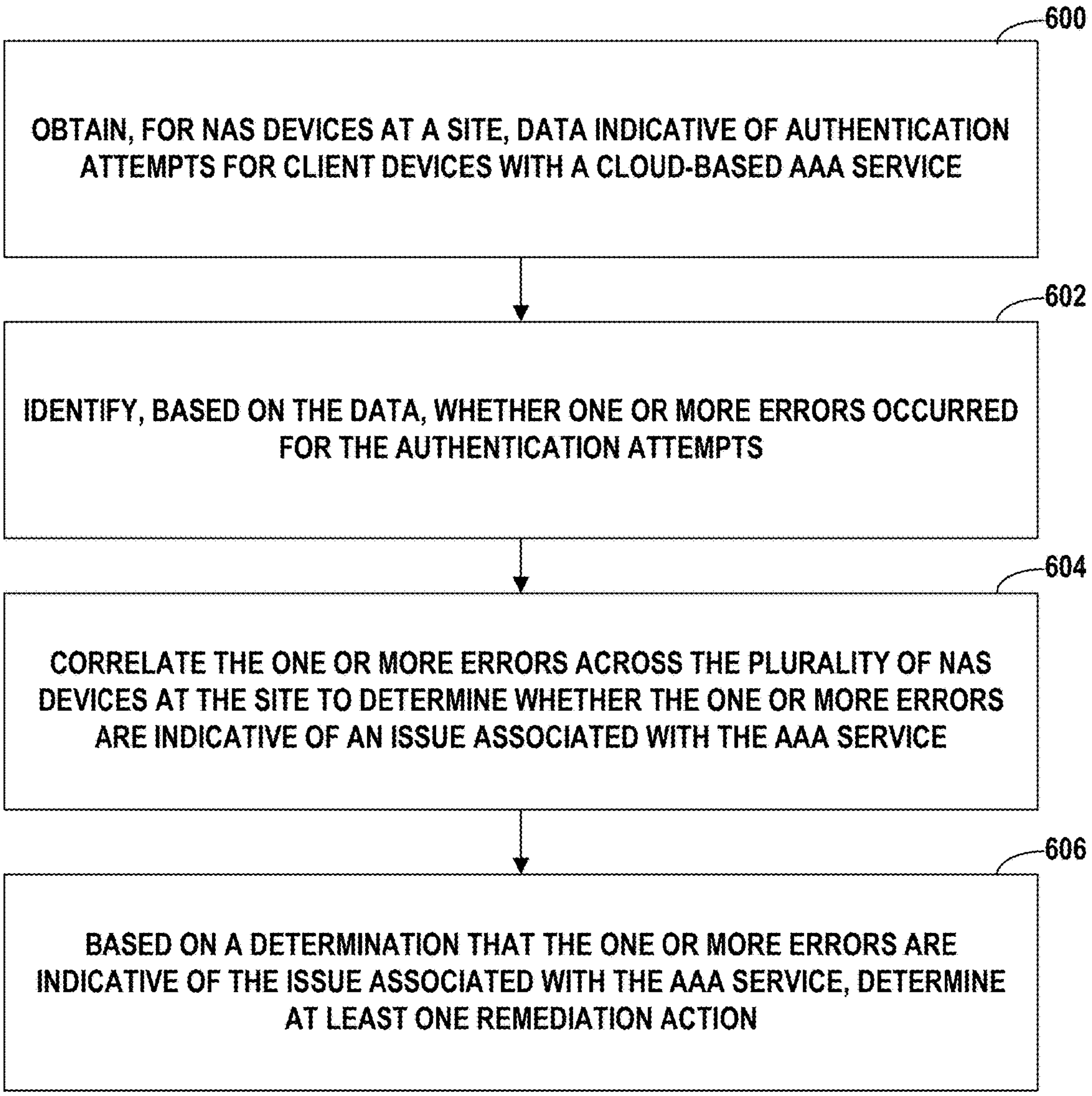
FIG. 6 is a flow chart illustrating an example operation of detecting issues associated with a AAA service, in accordance with one or more techniques of this disclosure.

FIG. 6 is a flow chart illustrating an example operation of an AAA issue detection engine, in accordance with one or more techniques of this disclosure. The example operation of FIG. 6 is described with respect to NMS 130 from FIGS. 1A and 1B.

NMS 130 obtains, for a plurality of NAS devices 108 at site 102, data indicative of authentication attempts for client devices 148 with cloud-based AAA services 110 (600). NMS 130 may obtain data indicative of authentication attempts consistently via actual or test authentication attempts. In one example, NMS 130 may be configured to initiate an authentication test at one or more of NAS devices 108 at site 102 to obtain the data indicative of the authentication attempts. To initiate the authentication test, NMS 130 may be configured to select a software package from a plurality of software packages that may comprise instructions for simulating client device 148. Further, NMS 130 may send, to at least one NAS device of NAS devices 108, the selected software package to cause the at least one NAS device to simulate client device 148 to obtain data indicative of authentication attempts for simulated client device 148 with AAA service 110. Authentication tests may allow NMS 130 to obtain data indicative of authentication attempts even during natural network downtimes, such as in the middle of the night.

NMS 130 identifies, based on the data indicative of authentication attempts, whether one or more errors occurred for the authentication attempts (602). In one example, to identify that the one or more errors occurred for the authentication attempts, NMS 130 may be configured to identify one or more transmission errors, in which access requests of the authentication attempts for client devices 148 do not reach AAA service 110, from one or more transmission error reports in the data for NAS devices 108. The one or more transmission errors may be indicative of a reachability issue associated with AAA service 110 caused by configuration at firewall 114 along a data path from NAS devices 108 at site 102 to cloud-based AAA service 110. In another example, to identify that the one or more errors occurred for the authentication attempts, NMS 130 may be configured to identify one or more authentication or authorization errors, in which NAS devices 108 receive responses to the access requests from AAA service 110, based on comparing the responses in the data for NAS devices 108 to one or more expected responses. The one or more authentication or authorization errors may be indicative of a functionality issue associated with AAA service 110 caused by at least one of a policy configuration issue or an infrastructure issue.

NMS 130 correlates the one or more errors across the plurality of NAS devices 108 at site 102 to determine whether the one or more errors are indicative of an issue associated with AAA service 110 (604), as opposed to a more localized issue at a single NAS device at site 102. In one example, to correlate the one or more errors across the plurality of NAS devices 108 at site 102, NMS 130 may be configured to determine a quantity of NAS devices from NAS devices 108 that reported or experienced a first type of error associated with AAA service 110. Based on the quantity of NAS devices satisfying a threshold, NMS 130 may determine that the first type of error is indicative of a first issue associated with AAA service 110. NMS 130, in some examples, may use one or more ML models to perform the correlation of errors.

Based on NMS 130 determining that the one or more errors are indicative of the issue associated with AAA service 110, NMS 130 determines at least one remediation action (606). In one example, the remediation action for the reachability issue associated with AAA service 110 comprises a configuration change at the firewall to enable the access requests of the authentication attempts for client devices 148 to reach AAA service 110. In another example, the remediation action for the functionality issue associated with AAA service 110 comprises a recommended work around for the at least one of the policy configuration or the infrastructure issue. In one example, NMS 130 may send a remediation action to an administrator device 111 associated with the site and/or the enterprise. In another example, NMS 130 may remediate the issue associated with AAA service 110 by sending instructions corresponding to a remediation action to a device within network system 100.

In some examples, issues may arise with AAA service 110 as a result of seemingly unrelated configuration changes and/or updates to network 106, such that an administrator associated with site 102 may not be aware that such changes or updates would or could impact AAA service 110. According to the disclosed techniques, NMS 130 may preemptively determine that there is an issue associated with AAA service 110 and determine an action to remediate the issue before an end user ever encounters the issue and without the administrator needing to manually test and/or troubleshoot AAA service 110 to determine the issue. For example, use of authentication tests ensures consistent occurrence of authentication attempts, even during natural downtimes in the network, in order to continually test the reachability and functionality of cloud-based AAA service 110 against network configuration changes and/or updates. In this way, the techniques of this disclosure potentially prevent network performance issues that may negatively impact an end user of the network.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset. If implemented in hardware, this disclosure may be directed to an apparatus such as a processor or an integrated circuit device, such as an integrated circuit chip or chipset. Alternatively, or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random-access memory (RAM), read-only memory (ROM), non-volatile random-access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

What is claimed is:

1. A system comprising:
memory; and
processing circuitry configured to:
obtain, for a plurality of network access service (NAS) devices at a site, data indicative of authentication attempts for client devices with a cloud-based authentication, authorization, and accounting (AAA) service;
identify one or more transmission errors based on transmission error reports in the data, wherein the one or more transmission errors indicate access requests of the authentication attempts for the client devices that do not reach the AAA service;
correlate the one or more transmission errors across the plurality of NAS devices at the site to determine whether the one or more transmission errors are indicative of a reachability issue associated with the AAA service caused by encryption features at a firewall along a data path from the plurality of NAS devices at the site to the AAA service, wherein the firewall drops the access requests of the authentication attempts; and
based on a determination that the one or more transmission errors are indicative of the reachability issue associated with the AAA service, determine at least one remediation action.

2. The system of claim 1, wherein to correlate the one or more transmission errors across the plurality of NAS devices at the site, the processing circuitry is configured to:
determine a quantity of NAS devices from the plurality of NAS devices that reported or experienced a transmission error of the one or more transmission errors; and
based on the quantity of NAS devices satisfying a threshold, determine that the one or more transmission errors are indicative of the reachability issue associated with the AAA service.

3. The system of claim 1, wherein the remediation action for the reachability issue associated with the AAA service comprises a configuration change at the firewall to enable the access requests of the authentication attempts for the client devices to reach the AAA service.

4. The system of claim 3, wherein the configuration change at the firewall comprises disabling one or more of the encryption features on one or more ports of the firewall.

5. The system of claim 1, wherein the processing circuitry is configured to identify one or more authentication or authorization errors, in which the plurality of NAS devices receive responses to the access requests from the AAA service, based on comparing the responses in the data for the plurality of NAS devices to one or more expected responses.

6. The system of claim 5, wherein the one or more authentication or authorization errors are indicative of a functionality issue associated with the AAA service caused by at least one of a policy configuration issue or an infrastructure issue.

7. The system of claim 6, wherein the remediation action for the functionality issue associated with the AAA service comprises a recommended work around for at least one of the policy configuration or the infrastructure issue.

8. The system of claim 1, wherein to obtain the data indicative of the authentication attempts, the processing circuitry is configured to initiate an authentication test at one or more of the plurality of NAS devices at the site.

9. The system of claim 8, wherein to initiate the authentication test, the processing circuitry is configured to:
select a software package from a plurality of software packages, the selected software package comprising instructions for simulating a client device; and
send, to at least one NAS device of the plurality of NAS devices, the selected software package to cause the at least one NAS device to simulate the client device to obtain the data indicative of authentication attempts for the simulated client device with the AAA service.

10. The system of claim 1, wherein the encryption features at the firewall comprise a secure sockets layer encryption on a port of the firewall that is receiving the access requests.

11. A method comprising:
obtaining, for a plurality of network access service (NAS) devices at a site, data indicative of authentication attempts for client devices with a cloud-based authentication, authorization, and accounting (AAA) service;
identifying, one or more transmission errors based on transmission error reports in the data, wherein the one or more transmission errors indicate access requests of the authentication attempts for the client devices that do not reach the AAA service;
correlating the one or more transmission errors across the plurality of NAS devices at the site to determine whether the one or more transmission errors are indicative of a reachability issue associated with the AAA service caused by encryption features at a firewall along a data path from the plurality of NAS devices at the site to the AAA service, wherein the firewall drops the access requests of the authentication attempts; and
based on determining that the one or more transmission errors are indicative of the reachability issue associated with the AAA service, determining at least one remediation action.

12. The method of claim 11, wherein correlating the one or more transmission errors across the plurality of NAS devices at the site further comprises:
determining a quantity of NAS devices from the plurality of NAS devices that reported or experienced a transmission error of the one or more transmission errors; and
based on the quantity of NAS devices satisfying a threshold, determining that the one or more transmission errors are indicative of the reachability issue associated with the AAA service.

13. The method of claim 11, further comprising identifying one or more authentication or authorization errors, in which the plurality of NAS devices receive a response to the access request from the AAA service, based on comparing the responses in the data for the plurality of NAS devices to one or more expected responses.

14. The method of claim 13, wherein the one or more authentication or authorization errors are indicative of a functionality issue associated with the AAA service caused by at least a policy configuration issue or an infrastructure issue.

15. The method of claim 11, wherein obtaining the data indicative of the authentication attempts comprises initiating an authentication test at one or more of the plurality of NAS devices at the site.

16. The method of claim 15, wherein initiating the authentication test comprises:

selecting a software package from a plurality of software packages, the selected software package comprising instructions for simulating a client device; and sending, to at least one NAS device of the plurality of NAS devices, the selected software package to cause the at least one NAS device to simulate the client device to obtain the data indicative of authentication attempts for the simulated client device with the AAA service.

17. Non-transitory computer-readable media having instructions stored thereon that, when executed, cause one or more processors to:

obtain, for a plurality of network access service (NAS) devices at a site, data indicative of authentication attempts for client devices with a cloud-based authentication, authorization, and accounting (AAA) service;

identify, one or more transmission errors based on transmission error reports in the data, wherein the one or more transmission errors indicate access requests of the authentication attempts for the client devices that do not reach the AAA service;

correlate the one or more transmission errors across the plurality of NAS devices at the site to determine whether the one or more transmission errors are indicative of a reachability issue associated with the AAA service caused by encryption features at a firewall along a data path from the plurality of NAS devices at the site to the AAA service, wherein the firewall drops the access requests of the authentication attempts; and based on a determination that the one or more transmission errors are indicative of the reachability issue associated with the AAA service, determine at least one remediation action.

18. The non-transitory computer-readable media of claim 17, wherein to correlate the one or more transmission errors across the plurality of NAS devices at the site, the instructions cause the one or more processors to:

determine a quantity of NAS devices from the plurality of NAS devices that reported or experienced a transmission error of the one or more transmission errors; and based on the quantity of NAS devices satisfying a threshold, determine that the one or more transmission errors are indicative of the reachability issue associated with the AAA service.

* * * * *